US007911629B2

(12) United States Patent
Shimizu

(10) Patent No.: US 7,911,629 B2
(45) Date of Patent: Mar. 22, 2011

(54) IMAGE RESOLUTION AND TEXT CONVERSION MANAGEMENT

(75) Inventor: Takayuki Shimizu, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1263 days.

(21) Appl. No.: 11/473,804

(22) Filed: Jun. 23, 2006

(65) Prior Publication Data

US 2006/0294154 A1    Dec. 28, 2006

(30) Foreign Application Priority Data

Jun. 23, 2005   (JP) .................................. 2005-183461

(51) Int. Cl.
*G06K 15/00*   (2006.01)
(52) U.S. Cl. ........... 358/1.14; 358/1.9; 358/462; 705/59
(58) Field of Classification Search .................. 358/1.2, 358/1.9, 1.16, 3.23, 528, 523, 537, 538, 404, 358/426.06, 448, 452–466, 1.14; 382/190, 382/181; 726/32; 399/366; 705/51–59, 705/14.25
See application file for complete search history.

(56) References Cited

U.S. PATENT DOCUMENTS

| | | | | |
|---|---|---|---|---|
| 4,956,666 A | * | 9/1990 | Allen et al. .................. | 399/366 |
| 5,640,467 A | * | 6/1997 | Yamashita et al. ........... | 382/181 |
| 5,752,152 A | * | 5/1998 | Gasper et al. ................ | 399/366 |
| 5,781,653 A | * | 7/1998 | Okubo ......................... | 382/135 |
| 5,821,929 A | * | 10/1998 | Shimizu et al. ............... | 382/190 |
| 6,483,609 B1 | * | 11/2002 | Ueno et al. ................... | 358/434 |
| 6,580,820 B1 | * | 6/2003 | Fan .............................. | 382/135 |
| 7,233,697 B2 | * | 6/2007 | Mizutani ...................... | 382/190 |
| 7,245,765 B2 | * | 7/2007 | Myers et al. ................. | 382/181 |
| 2006/0290967 A1 | * | 12/2006 | Sumitomo et al. ........... | 358/1.14 |
| 2007/0046976 A1 | * | 3/2007 | Kasatani ...................... | 358/1.14 |
| 2008/0019746 A1 | * | 1/2008 | Takiyama et al. ............. | 399/366 |

FOREIGN PATENT DOCUMENTS

| | | |
|---|---|---|
| JP | 08-202731 A | 8/1996 |
| JP | 2000-033730 A | 2/2000 |
| JP | 2002-149371 A | 5/2002 |
| JP | 2002-189686 A | 7/2002 |
| JP | 2004-118243 A | 4/2004 |
| JP | 2005-057490 A | 3/2005 |

* cited by examiner

*Primary Examiner* — Twyler L Haskins
*Assistant Examiner* — Dennis Dicker
(74) *Attorney, Agent, or Firm* — Rossi, Kimms & McDowell LLP

(57) ABSTRACT

A document management system which can reduce the space used in a storage medium of an information processing apparatus which receives data. It is determined whether or not the resolution of image data generated by an image forming apparatus connected to the information processing apparatus managing image data via a network is higher than a predetermined resolution. If the resolution of the generated image data is higher than the predetermined resolution, the resolution of the generated image data is converted into a low resolution. The resultant image data is registered in association with log information in a storage medium, in the information processing apparatus.

2 Claims, 23 Drawing Sheets

| FOLDER ID | PARENT FOLDER ID | FOLDER NAME | DATE AND TIME OF CREATION |
|---|---|---|---|
| | | | |

| DOCUMENT ID | PARENT FOLDER ID | DOCUMENT NAME | SIZE | NUMBER OF PAGES | DATE AND TIME OF CREATION | LOG ID |
|---|---|---|---|---|---|---|
| | | | | | | |

| LOG ID | DEVICE NAME | PRODUCT NAME | IP ADDRESS | MAC ADDRESS |
|---|---|---|---|---|
| | | | | |

| COMMENT | DIVISION ID | USER NAME | IP ADDRESS |
|---|---|---|---|
| | | | |

| JOB TYPE | JOB NAME | NUMBER OF PAGES | NUMBER OF COPIES | DATE AND TIME OF STARTING | DATE AND TIME OF ENDING | JOB RESULT |
|---|---|---|---|---|---|---|
| | | | | | | |

| PAGE ID | PARENT DOCUMENT ID | PAGE NUMBER | FORMAT | SHEET SIZE | FILE SIZE | INDEX1 | INDEX2 | INDEX3 | VOLUME ID |
|---|---|---|---|---|---|---|---|---|---|
| | | | | | | | | | |

FIG. 11

```xml
<?xml version="1.0" encoding="UTF-16"?>
<!-- Sample-->
<logInformation xmlns:xllnk="http://www.w3.org/1999/xllnk">
    <deviceInformation>
        <deviceName>My Device</deviceName>
        <productName>xxxxxx</productName>
        <ipAddress>122.27.45.109</ipAddress>
        <comment/>
        <location>35F</location>
    </deviceInformation>
    <userInformation>
        <departmentID>12345</departmentID>
        <userName>shimizu</userName>
        <ipAddress>122.27.45.23</ipAddress>
        <macAddress>00-3D-52-64-A8-E1</macAddress>
    </userInformation>
    <jobInformation>
        <jobType>Print</jobType>
        <jobName>My Document</jobName>
        <pageNum>1</pageNum>
        <copies>3</copies>
        <startDateTime>2004/06/11 13:44:59</startDateTime>
        <endDateTime>2004/06/11 13:45:14</endDateTime>
        <result>OK</result>
    </jobInformation>
</logInformation>
```

IMAGE RESOLUTION AND TEXT CONVERSION MANAGEMENT

BACKGROUND OF THE INVENTION

1. Field of the Invention

The present invention relates to a document management system in which an image forming apparatus which generates image data and an information processing apparatus which manages the image data are connected to each other via a network, a document management method, an image forming apparatus, an information processing apparatus, and a storage medium.

2. Description of the Related Art

Conventionally, document management systems have been known in which a document management server which stores/saves document information such as image data of documents created by reading originals such as printed characters, drawings, and images using a scanner unit and document data created using a word processor or the like in association with additional document information such as keywords, and a document management client which searches the information and, for example, displays and prints retrieved information are connected to each other via a network (see Japanese Laid-Open Patent Publication (Kokai) No. H08-202731).

Also, some printing systems have been known which store print data and log information for the purpose of preventing information leakage and auditing so that administrators can search and read the stored print data and log information (see Japanese Laid-Open Patent Publication (Kokai) No. 2004-118243).

Also, some document management systems have been known which manage the results of various jobs such as a print job and a scan job in the form of log data (see Japanese Laid-Open Patent Publication (Kokai) No. 2002-189686).

FIG. 23 is a diagram showing an example of the arrangement of a network document management system. This network document management system is constructed such that a document management client 1700, a document management server 1701, an image transfer apparatus 1706, and a digital multifunction apparatus 1707 are connected to one another via a network 1708.

The document management server 1701 is comprised of an attribute management server section 1702, an attribute database file 1703, a volume server section 1704, and a volume file 1705. The attribute management server section 1702 stores attribute information such as folder attributes, document attributes, and page attributes in the attribute database file 1703 using an RDBM (Relational Database Management System) which is a database management system for managing inclusive relations of folders, documents, and pages and attributes thereof so as to manage image data and document data as documents in hierarchical folders. The volume server section 1704 manages actual data associated with pages using the attribute management server section 1702 and stores document information such as image data and document data in the volume file 1705.

The document management client 1700 is a client of the network document management system and, for example, searches and reads documents managed by the document management server 1701. In this case, the document management client 1700 sends various requests to the attribute management server section 1702 using SQL (Structured Query Language) protocol defined on TCP/IP protocol and receives the results of processing of the requests from the attribute management server 1702. Also, when processing on image data or document data is requested, the document management client 1700 sends various requests to the volume server section 1704 using RPC (Remote Procedure Call) and receives the results of processing of the requests from the volume server section 1704.

The digital multifunction apparatus 1707 is a multifunction image forming apparatus having copying function, scanner function, printer function, facsimile (FAX) function, and so forth. The digital multifunction apparatus 1707 carries out various jobs such as a copy job and a print job and manages the results of such jobs as log data as disclosed in Japanese Laid-Open Patent Publication (Kokai) No. 2002-189686.

On the other hand, according to the invention of the present application, it is possible to manage log information on a job and image data used in the job (the contents of an image). To this end, for example, it can be envisaged that image data read from a scanner or image data printed by a printer as well as log information on a job are transmitted to the image transfer apparatus 1706 using a network protocol (for example, FTP). It should be noted that log information is comprised of device information indicative of a device name and an IP address, user information indicative of a user name and a division ID, and control information indicative of a job name, the date and time of starting/ending, the number of pages, the number of copies, the result of a job, and so froth. It can also be envisaged that the image transfer apparatus 1706 registers the log information and image data, which are received form the digital multifunction apparatus 1707 using a network protocol (for example, FTP), as documents in the document management server 1701 in accordance with registration settings regarding folders as storage locations set in advance. As is the case with the document management client 1700, the image transfer apparatus 1706 controls the transfer of information to the document management server 1701 so that log information can be stored as document attributes in the attribute management server section 1702 and image data can be stored in the volume server section 1704.

In the above document management system, however, image data of a job generated by the digital multifunction apparatus 1707 is sent as it is to the image transfer apparatus 1706 and stored in the document management server 1701, and therefore data size is large. For example, when image data generated by a copy job or a print job has a resolution of 600×600 dpi, the image data having the resolution of 600× 600 dpi is sent as it is to the image transfer apparatus 1706 and stored in the document management server 1701. The image data having the resolution of 600×600 dpi is large in size irrespective of whether it is multivalued color image data or binary black-and-white image data. In transferring such image data which is large in data size, a problem such as increased data transmission time, increased network load, or increased space used in a storage device of the document management server 1701 arises.

SUMMARY OF THE INVENTION

It is a first object of the present invention to provide a document management system, a document management method, an image forming apparatus, and an information processing apparatus which can reduce the space used in a storage medium of an information processing apparatus which receives data, as well as a storage medium. It is a second object of the present invention to provide a document management system, a document management method, an image forming apparatus, and an information processing apparatus which can shorten data transmission time period and lighten the load on a network in transferring data via the network, as well as a storage medium.

To attain the above objects, in a first aspect of the present invention, there is provided a document management system comprising an image forming apparatus that is connected to a network and generates image data, an information processing apparatus that is connected to the network and manages the image data, a determining device that determines whether a resolution of the generated image data is higher than a predetermined resolution, a resolution converting device that converts the resolution of the generated image data into a low resolution when the resolution of the generated image data is higher than the predetermined resolution, and a data registration device that registers the image data of which resolution has been converted into a low resolution in association with log information in a storage medium, in the information processing apparatus.

With the arrangement of the first aspect of the present invention, it is determined whether or not the resolution of generated image data is higher than a predetermined resolution, and when the resolution of generated image data is higher than the predetermined resolution, the resolution of the generated image data is converted into a low resolution, and in the information processing apparatus, the image data with the low resolution obtained by the conversion is registered in association with log information in the storage medium. It is therefore possible to reduce the space used in the storage medium of the information processing apparatus which is a data receiving end.

Preferably, the document management system comprises a transfer device that transfers the image data of which resolution has been converted into a low resolution from the image forming apparatus to the information processing apparatus via the network, and in the image forming apparatus, the resolution converting device converts the resolution of the generated image data into a low resolution.

With this arrangement, it is possible to shorten the data transmission time period and lighten the load on the network in transferring data via the network.

Preferably, the document management system comprises a transfer device that transfers the generated image data from the image forming apparatus to the information processing apparatus via the network, and in the information processing apparatus, the resolution converting device converts the resolution of the generated image data into a low resolution.

Still preferably, the resolution converting device carries out region segmentation on the generated image data, extracts an average character height of each line in a character region, and converts the resolution of the generated image data into a resolution suitable for character recognition of a line in which the average character height is the minimum.

With this arrangement, it is possible to set the resolution of data to the minimum resolution at which characters can be recognized.

Preferably, the log information is generated based on a job executed by the image forming apparatus, and the generated image data comprises image data indicative of contents of the job.

With this arrangement, since log information on jobs and image data indicative of the contents of the jobs are registered in association with each other, a job of which information has been leaked can be identified, which can suppress information leakage.

To attain the above object, in a second aspect of the present invention, there is provided a document management system comprising an image forming apparatus that is connected to a network and generates image data, an information processing apparatus that is connected to the network and manages text data, a determining device that determines whether the generated image data satisfies predetermined conditions, a text converting device that carries out character recognition to convert the image data into text data when the generated image data satisfies the predetermined conditions, and a data registration device that registers the text data obtained by the conversion in association with log information in a storage medium, in the information processing apparatus.

With this arrangement, it is determined whether or not generated image data satisfies predetermined conditions, and when the generated image data satisfies the predetermined conditions, character recognition is carried out to convert the image data into text data, and in the information processing apparatus, the text data obtained by the conversion is registered in the storage medium. As a result, the space used in the storage medium of the information processing apparatus can be further reduced.

Preferably, the document management system comprises a transfer device that transfers the text data obtained by the conversion from the image forming apparatus to the information processing apparatus via the network, and in the image forming apparatus, the text converting device converts the image data into text data.

With this arrangement, it is possible to shorten the data transmission time period, further, and lighten the load on the network, further, in transferring data via the network.

Preferably, the document management system comprises a transfer device that transfers the image data from the image forming apparatus to the information processing apparatus via the network, and in the information processing apparatus, the text converting device converts the image data into text data.

Still preferably, the determining device carries out region segmentation on the generated image data, extracts a character region, and determines whether a ratio of the character region is not less than a predetermined ratio, and the text converting device converts the image data into text data when the ratio of the character region is not less than the predetermined ratio.

With this arrangement, whether to convert image data into text data can be determined according to the size of a character region in the image data.

Preferably, the determining device determines whether the number of characters included in the image data is not less than a predetermined number of characters, and the text converting device converts the image data into text data when the number of characters included in the image data is not less than the predetermined number of characters.

With this arrangement, whether to convert image data into text data can be determined according to the number of characters in the image data.

Preferably, the determining device carries out character recognition to extract a text from the image data and determines whether a predetermined keyword is included in the extracted text, and the text converting device converts the image data into text data when the predetermined keyword is included in the extracted text.

With this arrangement, only image data that is worthwhile being converted into text data can be converted into text data.

Preferably, the determining device carries out character recognition to extract a text from the image data, manages the number of times a job in which a predetermined keyword is included in the extracted text is executed as the number of unauthorized job executions with respect to each user, and determines whether the number of unauthorized job executions is not less than a predetermined number of unauthorized job executions, and the text converting device converts the image data into text data when the number of unauthorized job executions is less than the predetermined number of unauthorized job executions, and does not convert the image data into text data when the number of unauthorized job executions is not less than the predetermined number of unauthorized job executions.

With this arrangement, since image data is inhibited from being converted into text data in the case where a try to carry out an authorized job is repeatedly made, security can be improved.

Preferably, the data registration device registers the generated image data in association with the log information in the storage medium when the determining device determines that the generated image data unsatisfies the predetermined conditions.

With this arrangement, since image data that does not satisfy predetermined conditions is inhibited from being converted into text data, security can be improved.

Preferably, the data registration device converts the resolution of the generated image data into a low resolution and then registers the image data in association with the log information in the storage medium when the determining device determines that the generated image data unsatisfies the predetermined conditions.

With this arrangement, since the resolution of image data that is not converted into text data is converted into a low resolution, the space used in the storage medium can be reduced.

Preferably, the log information is generated based on a job executed by the image forming apparatus, and the generated image data comprises image data indicative of contents of the job.

With this arrangement, a job of which information has been leaked can be identified.

To attain the above objects, in a third aspect of the present invention, there is provided a document management method for a document management system in which an image forming apparatus which generates image data and an information processing apparatus which manages managing the image data are connected to each other via a network, comprising a determining step of determining whether a resolution of the generated image data is higher than a predetermined resolution, a resolution converting step of converting the resolution of the generated image data into a low resolution when the resolution of the generated image data is higher than the predetermined resolution, and a data registration step of registering the image data of which resolution has been converted into a low resolution in association with log information in a storage medium.

To attain the above objects, in a fourth aspect of the present invention, there is provided a document management method for a document management system in which an image forming apparatus which generates image data and an information processing apparatus which manages text data are connected to each other via a network, comprising a determining step of determining whether the generated image data satisfies predetermined conditions, a text converting step of carrying out character recognition to convert the image data into text data when the generated image data satisfies the predetermined conditions, and a data registration step of registering the text data obtained by the conversion in association with log information in a storage medium.

To attain the above objects, in a fifth aspect of the present invention, there is provided an image forming apparatus connected to an information processing apparatus that manages image data via a network, comprising an image forming device that generates image data, a determining device that determines whether a resolution of the generated image data is higher than a predetermined resolution, a resolution converting device that converts the resolution of the generated image data into a low resolution when the resolution of the generated image data is higher than the predetermined resolution, and a transmitting device that transmits the image data of which resolution has been converted into a low resolution in association with log information to the information processing apparatus via the network.

To attain the above objects, in a sixth aspect of the present invention, there is provided an image forming apparatus connected to an information processing apparatus that manages text data via a network, comprising an image forming device that generates image data, a determining device that determines whether the generated image data satisfies predetermined conditions, a text converting device that carries out character recognition to convert the image data into text data when the generated image data satisfies the predetermined conditions, and a transmitting device that transmits the text data obtained by the conversion in association with log information to the information processing apparatus via the network.

To attain the above objects, in a seventh aspect of the present invention, there is provided an information processing apparatus connected to an image forming apparatus that generates image data via a network, for managing the image data, comprising a storage medium, a receiving device that receives the generated image data from the image forming apparatus, a determining device that determines whether a resolution of the received image data is higher than a predetermined resolution, a resolution converting device that converts the resolution of the received image data into a low resolution when the resolution of the received image data is higher than the predetermined resolution, and a data registration device that registers the image data of which resolution has been converted into a low resolution in association with log information in the storage medium.

To attain the above objects, in a eighth aspect of the present invention, there is provided an information processing apparatus connected to an image forming apparatus that generates image data, for managing text data, comprising a storage medium, a receiving device that receives the generated image data from the image forming apparatus, a determining device that determines whether the received image data satisfies predetermined conditions, a text converting device that carries out character recognition to convert the image data into text data when the received image data satisfies the predetermined conditions, and a data registration device that registers the text data obtained by the conversion in association with log information in the storage medium.

To attain the above objects, in a ninth aspect of the present invention, there is provided a computer-readable storage medium storing a computer program for controlling an image forming apparatus, the program including a program code for causing a computer to execute the following steps: a determining step of determining whether a resolution of generated image data is higher than a predetermined resolution, a resolution converting step of converting the resolution of the generated image data into a low resolution when the resolution of the generated image data is higher than the predetermined resolution, and a transmitting step of transmitting the image data of which resolution has been converted into a low resolution in association with log information to an information processing apparatus connected to the image forming apparatus via a network.

To attain the above objects, in a tenth aspect of the present invention, there is provided a computer-readable storage medium storing a computer program for controlling an image forming apparatus, the program including a program code for causing a computer to execute the following steps: a determining step of determining whether generated image data satisfies predetermined conditions, a text converting step of carrying out character recognition to convert the image data into text data when the generated image data satisfies the predetermined conditions, and a transmitting step of transmitting the text data obtained by the conversion in association with log information to an information processing apparatus connected to the image forming apparatus via a network.

To attain the above objects, in a eleventh aspect of the present invention, there is provided a computer-readable storage medium storing a computer program for controlling an information processing apparatus, the program including a program code for causing a computer to execute the following steps: a receiving step of receiving image data generated by an image forming apparatus, a determining step of determining whether a resolution of the received image data is higher than a predetermined resolution, a resolution converting step of converting the resolution of the received image data into a low resolution when the resolution of the received image data is higher than the predetermined resolution, and a data registration step of registering the image data of which resolution has been converted into a low resolution in association with log information in a storage medium.

To attain the above objects, in a twelfth aspect of the present invention, there is provided a computer-readable storage medium storing a computer program for controlling an information processing apparatus, the program including a program code for causing a computer to execute the following steps: a receiving step of receiving image data generated by an image forming apparatus, a determining step of determining whether the received image data satisfies predetermined conditions, a text converting step of carrying out character recognition to convert the image data into text data when the received image data satisfies the predetermined conditions, and a data registration step of registering the text data obtained by the conversion in association with log information in a storage medium.

The above and other objects, features, and advantages of the invention will become more apparent from the following detailed description taken in conjunction with the accompanying drawings.

BRIEF DESCRIPTION OF THE DRAWINGS

FIGS. 5A to 5D are views showing tables for managing inclusive relations of folders, documents, and pages and attributes thereof, which are stored in an attribute storage section appearing in FIG. 4 and managed by a database processing section;

FIG. 11 is a diagram showing an XML schema of log information stored in a hard disk drive of the digital multifunction apparatus;

DETAILED DESCRIPTION OF THE PREFERRED EMBODIMENTS

The present invention will now be described in detail with reference to the drawings showing preferred embodiments thereof. A document management system according to the embodiments described below is applied to a network document management system which manages document information transmitted and received via a network. Examples of the document information include image data of documents created using a scanner by reading originals such as printed characters, drawings, and images, and document data created using a word processor or the like.

First, a description will be given of a first embodiment of the present invention.

Figure 1:
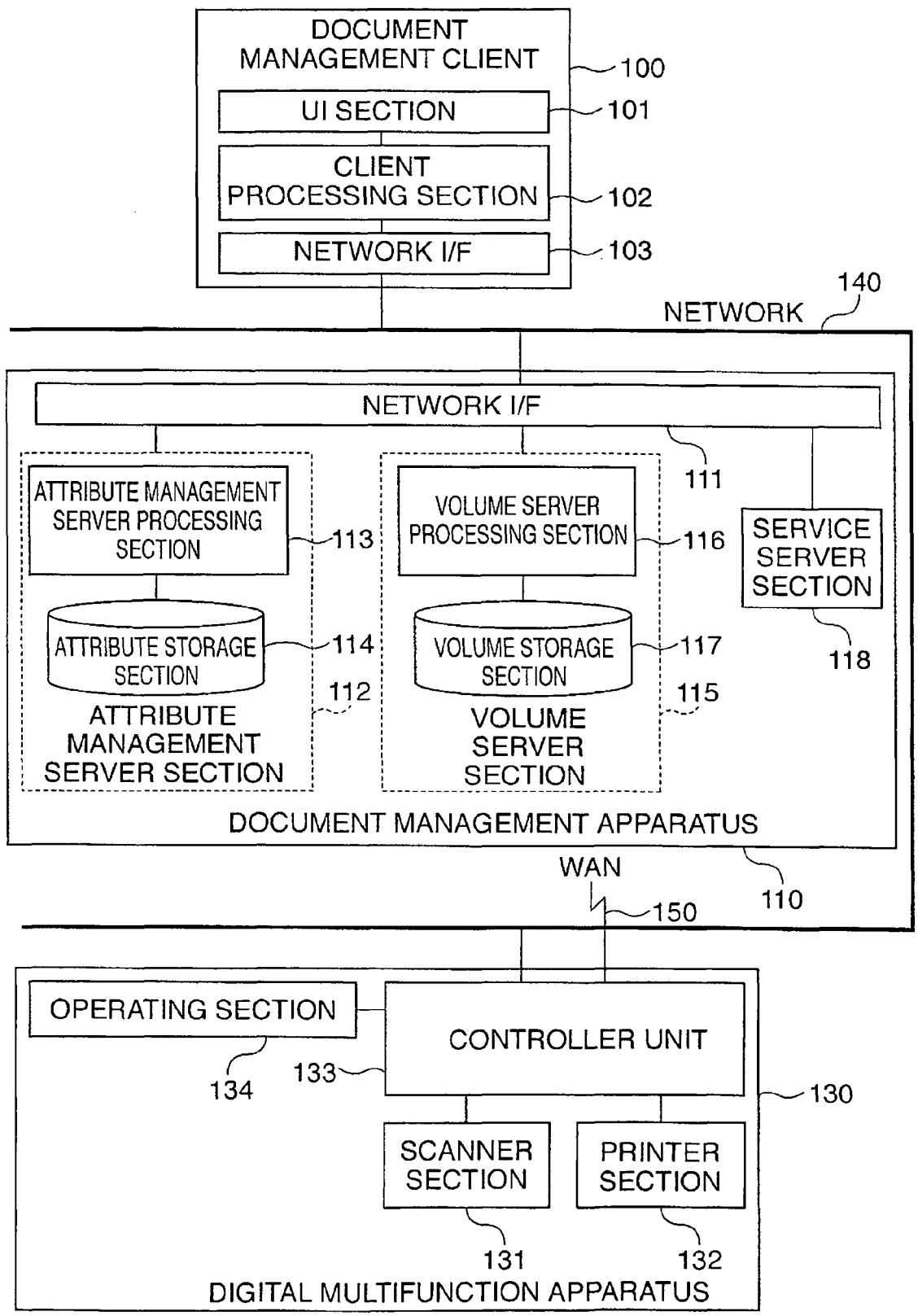
FIG. 1 is a diagram showing the arrangement of a network document management system according to a first embodiment of the present invention.

FIG. 1 is a diagram showing the arrangement of a network document management system according to the first embodiment. This network document management system is constructed such that a document management client apparatus 100, a document management server apparatus 110, and a digital multifunction apparatus 130 are connected to one another via a network 140.

The document management client apparatus (hereinafter merely refereed to as "the document management client") 100 searches and displays document information managed by the document management server apparatus (hereinafter referred to as "the document management server") 110 and is comprised of a user interface (UI) section 101, a client processing section 102, and a network I/F 103. The user interface (UI) section 101 is comprised of a display device implemented by a CRT or a liquid crystal display, and an input device such as a keyboard or pointing device. The user interface (UI) section 101 receives instructions associated with various functions of the document management client 100 such as search and display of document information and provides an operator with various kinds of information such as the results of processing of the instructions. The client processing section 102 is comprised of a CPU, a memory, and so forth, and performs processing associated with various functions of the document management client 100 such as search and display of document information. When processing by the document management server 110 is requested, the client processing section 102 transmits various request commands to the document management server 110 and receives responses thereto via the network I/F 103.

The document management server 110 is comprised of a network I/F 111, an attribute management server section 112, a volume server section 115, and a service server section 118, and manages log information and contents data of a job (i.e. data indicative of, for example, the contents of an image used in a job) transmitted from the digital multifunction apparatus 130. Although in the present embodiment, the attribute management server section 112, volume server section 115, and service server section 118 are implemented by one personal computer, they may be implemented by respective individual personal computers connected to one another via the network 140.

The network I/F 111 is connected to the network 140, for performing processing using network protocols such as TCP/IP.

The attribute management server section 112 is comprised of an attribute management server processing section 113 which manages inclusive relations of folders, documents, and pages, attributes thereof, and so forth so as to manage log information and contents data of jobs as documents stored in hierarchical folders, and an attribute storage section 114. The attribute management server processing section 113 is comprised of a CPU, a memory, and so forth, and receives a request command from the client processing section 102 or the service server section 118 via the network I/F 111, performs processing such as update or search on the attribute storage section 114, and sends the result of the processing to the client processing section 102 or the service server section 118. The attribute storage section 114 is typically comprised of a hard disk drive 239b (see FIG. 2), which is a large-capacity storage device, and stores folder attributes, document attributes, log information, page attributes, and so forth.

The volume server section 115 stores and manages contents data associated with respective pages by the attribute management server section 112 and is comprised of a volume server processing section 116 and a volume storage section 117. The volume server processing section 116, which is comprised of a CPU, a memory, and so forth, receives a request command from the client processing section 102 or the service server section 118 via the network I/F 111, performs processing such as update or data acquisition on the volume storage section 117, and sends the result of the processing to the client processing section 102 or the service server section 118. The volume storage section 117 is typically comprised of the hard disk drive 239b (see FIG. 2), which is a large-capacity storage device, and stores contents data.

The service server section 118, which is comprised of a CPU, a memory, and so forth, receives request commands from the digital multifunction apparatus 130 via the network I/F 111 and performs processing requested by the digital multifunction apparatus 130. When processing by the attribute management server section 112 or the volume server section 115 such as registration of job log information and contents data is requested, the service server section 118 transmits various request commands to the attribute management server section 112 or the volume server section 115 via the network I/F 111, receives responses thereto, and sends the results of the processing to the digital multifunction apparatus 130.

The digital multifunction apparatus 130, which is a multifunction image forming apparatus having copying function, scanner function, printer function, facsimile (FAX) function, etc., is comprised of a scanner section 131 which is an image input device, a printer section 132 which is an image output device, a controller unit 133, and an operating section 134 which is a user interface. The scanner section 131, printer section 132, and operating section 134 are connected to the controller unit 133. Also, the controller unit 133 is connected to the network (LAN) 140 and a public telephone line (WAN) 150. The controller unit 133 performs processing of a copy job, a print job, or the like in accordance with information input via the operating section 134, provides the operating section 134 with information on the status of the apparatus, the status of the job and the like, and stores image data and log information of the generated job. When processing by the document management server 110 is requested, the controller unit 133 sends a request command to the service server section 118, receives a response thereto from the service server section 118, and provides the operating section 134 with information acquired from the document management server 110.

Figure 2:
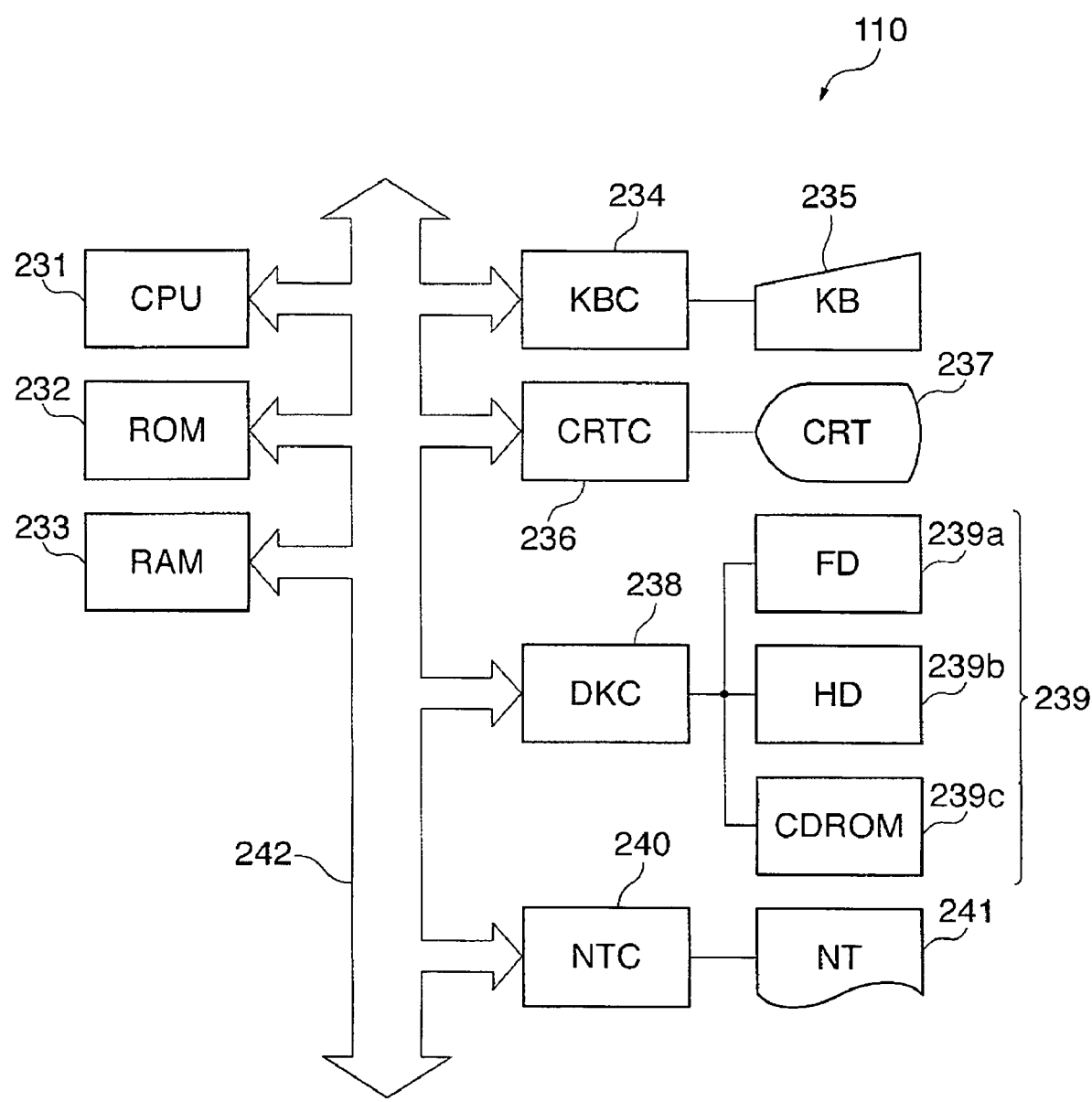
FIG. 2 is a diagram showing an example of the hardware configuration of a document management server appearing in FIG. 1.

FIG. 2 is a diagram showing an example of the hardware configuration of the document management server 110. The document management client 100 and the document management server 110 are identical in configuration with each other, and therefore a description will now be given of only the document management server 110. A CPU 231 is a central processing unit which controls the entire apparatus and performs computations. A ROM 232 is a read-only memory which stores a system boot program, a main I/O program, character pattern data (font data) for converting character codes into bit patterns, and so forth. A RAM 233 is a random access memory which temporarily stores data for use in computation performed by the CPU 231, computation results, character pattern data strings converted from character codes so as to be displayed, graphics data, image data, and so forth.

A keyboard controller (KBC) 234 receives key input data (character codes and control codes) from a keyboard (KB)

235 and transmits then to the CPU 231. A display controller (CRTC) 236 reads out character pattern data strings stored in the RAM 233 and transfers them to a display unit (CRT) 237. The display unit (CRT) 237 receives character pattern data strings, graphics data, and image data from the display controller (CRTC) 236 and displays them on a display screen.

A disk controller (DKC) 238 controls access to external storage devices 239. In the present embodiment, a Floppy (registered trademark) disk drive (FD) 239a, the hard disk drive (HD) 239b, a CD-ROM drive 239c are connected as the external storage devices 239 to the disk controller (DKC) 238. The hard disk drive 239b stores a character expanding processing program for reading out character pattern data (font data) and font data and converting them into bitmap data, a graphics expanding processing program for processing graphic data, and an image data processing program for processing image data, as well as various programs, described later. The hard disk drive 239b also serves as the above described attribute storage section 114 and volume storage section 117.

Printer drivers and related data are supplied from the external storage devices 239 such as the floppy (registered trademark) disk drive 239a and the CD-ROM drive 239c. A network controller (NTC) 240 controls the operation of a network device 241. A system bus 242 carries out data transfer among the above-mentioned component parts.

Figure 3:
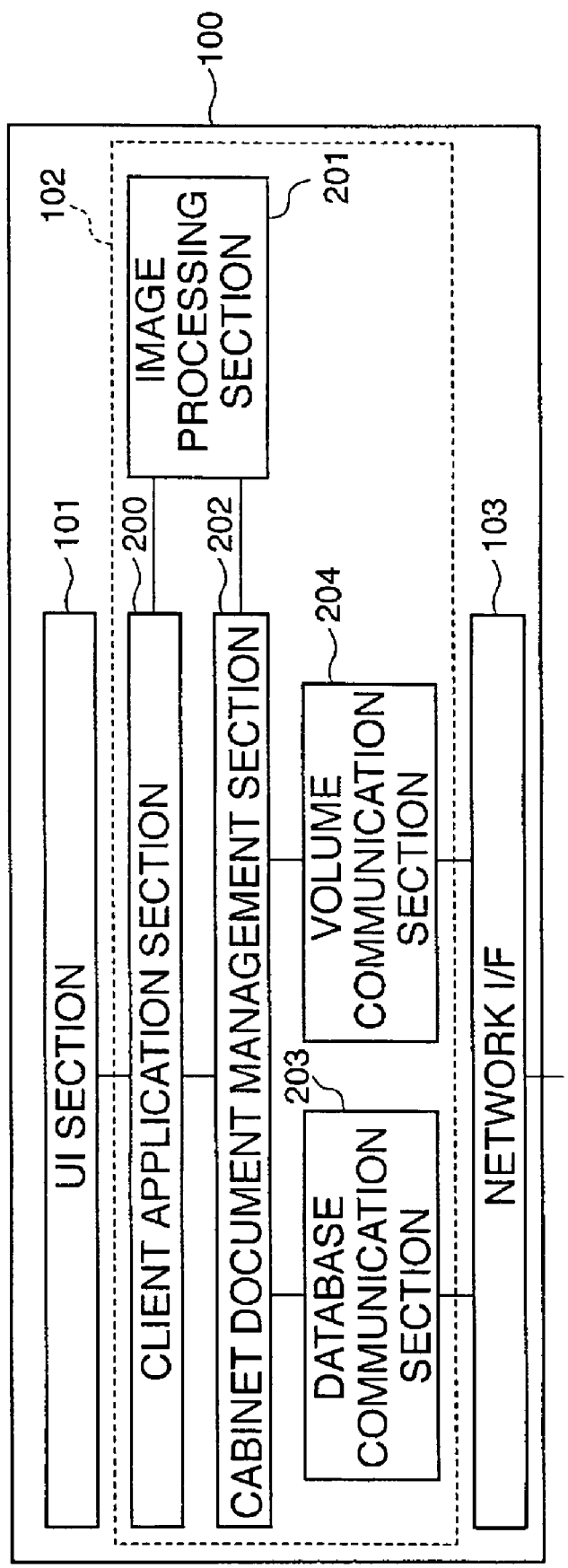
FIG. 3 is a diagram showing the functional configuration of a client processing section in a document management client appearing in FIG. 1.

FIG. 3 is a diagram showing the functional configuration of the client processing section 102 in the document management client 100. The client processing section 102 is comprised of a client application section 200, an image processing section 201, a cabinet document management section 202, a database communication section 203, and a volume communication section 204. The client application section 200 performs processing associated with various functions of the document management client 100 in accordance with instructions from the user interface (UI) section 101 and controls the display screen of the user interface (UI) section 101. When processing by the attribute management server section 112 or the volume server section 115 is requested, the client application section 200 transfers the request to the cabinet document management section 202. When the result of processing of the request is sent, the client application section 200 receives the processing result from the cabinet document management section 202. The image processing section 201 carries out various kinds of image processing such as expansion and compression of image data, color space conversion, foundation skip, enlargement/reduction, or rotation in accordance with a request from the client application section 200 or the cabinet document management section 202.

The cabinet document management section 202 makes it possible to make requests for the attribute management server section 112 and the volume server section 115 by using object models comprised of cabinets, folders, documents, and pages. When processing such as reference or update of folder attributes, document attributes, and page attributes is requested, the cabinet document management section 202 sends the request to the database communication section 203 and receives the result of processing of the request from the database communication section 203. Also, when processing such as registration, deletion, and acquisition of contents data is requested, the cabinet document management section 202 sends the request to the volume communication section 204 and receives the result of processing of the request from the volume communication section 204.

The database communication section 203 transmits a request command for the attribute management server section 112 to a database communication section 205 (see FIG. 4) and receives a reply command thereto from the database communication section 205 via the network I/F 103 using SQL (Structured Query Language) protocol defined on TCP/IP protocol. The volume communication section 204 transmits a request command for the volume server section 115 and receives a reply command thereto from a volume communication section 207 (see FIG. 4) via the network I/F 103 using RPC (Remote Procedure Call).

Figure 4:
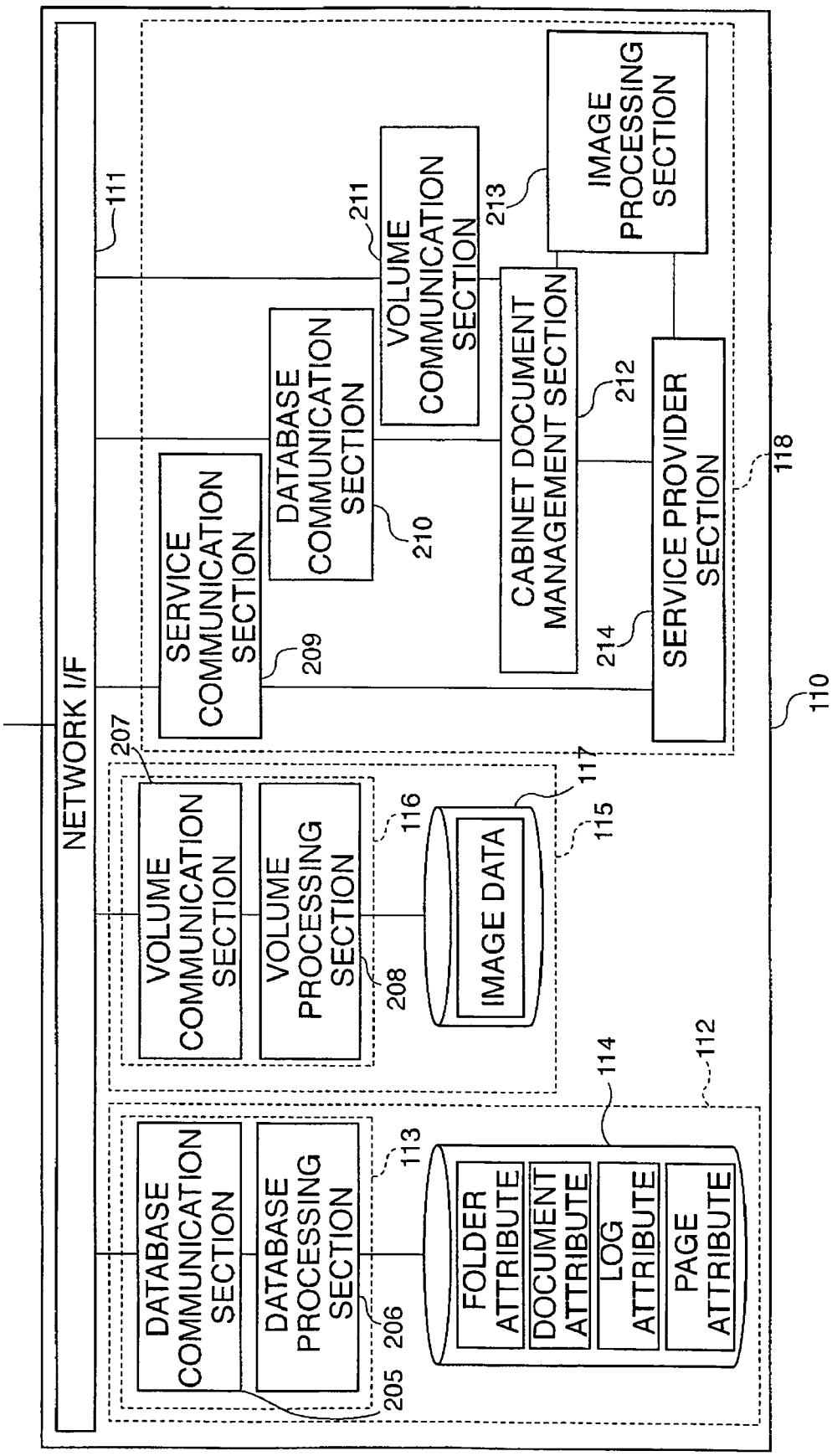
FIG. 4 is a diagram showing the functional configurations of an attoribute management server section, a volume server section, and a service server section in the document management server.

FIG. 4 is a diagram showing the functional configuration of the attribute management server section 112, volume server section 115, and service server section 118 in the document management server 110. The attribute management server processing section 113 in the attribute management server section 112 is comprised of the database communication section 205 and a database processing section 206.

Upon receiving a request command for the attribute management server section 112 from the database communication section 203 or a database communication section 210 via the network I/F 111 using SQL (Structured Query Language) protocol defined on TCP/IP protocol, the database communication section 205 sends the request to the database processing section 206. Upon receiving the result of processing of the request from the database processing section 206, the database communication section 205 sends it as a reply command to the database communication section 203 or the database communication section 210. The database processing section 206 performs processing such as update or search on the attribute storage section 114 as a database file using an RDBMS (Relational Database Management System) which is a database management system for managing the inclusive relations of folders, documents, and pages and attributes thereof.

FIGS. 5A to 5D are views showing tables for managing the inclusive relations of folders, documents, and pages and attributes thereof, which are stored in the attribute storage section 114 and managed by the database processing section 206. A folder management table 300 is comprised of folder IDs for identifying folders, parent folder IDs for identifying parent folders, folder names, and the dates and times of creation. A document management table 301 is comprised of document IDs for identifying documents, parent folder IDs for identifying parent folders, document names, sizes, the numbers of pages, the dates and times of creation, and log IDs for identifying associated logs.

A log information management table 302 is comprised of log IDs for identifying logs; device names, product names, IP addresses, and comments which are device information; division IDs, user names, IP addresses, and MAC addresses which are user information; job types, job names, the numbers of pages, the numbers of copies, the dates and times of starting, the dates and times of ending, and job results which are job information; and document IDs for identifying associated documents.

A page management table 303 is comprised of page IDs for identifying pages, parent document IDs for identifying parent documents, page numbers, formats for identifying the file formats of page data, sheet sizes for identifying sheet sizes in the case of image data, file sizes, indexes 1, indexes 2, and indexes 3 for searching for pages, and volume IDs for identifying image data managed by the volume server section 115.

As shown in FIG. 4, the volume server processing section 116 in the document management server 110 is comprised of the volume communication section 207 and a volume processing section 208. Upon receiving a request command for the volume server section 115 from the volume communication section 204 or a volume communication section 211 via the network I/F 111 using RPC (Remote Procedure Call), the volume communication section 207 sends the request to the volume processing section 208. Upon receiving the result of processing of the request from the volume processing section 208, the volume communication section 207 sends it as a reply command to the volume communication section 204 or the volume communication section 211. The volume processing section 208 performs processing such as update or data acquisition on the volume storage section 117 which is a volume file.

Figure 6A:
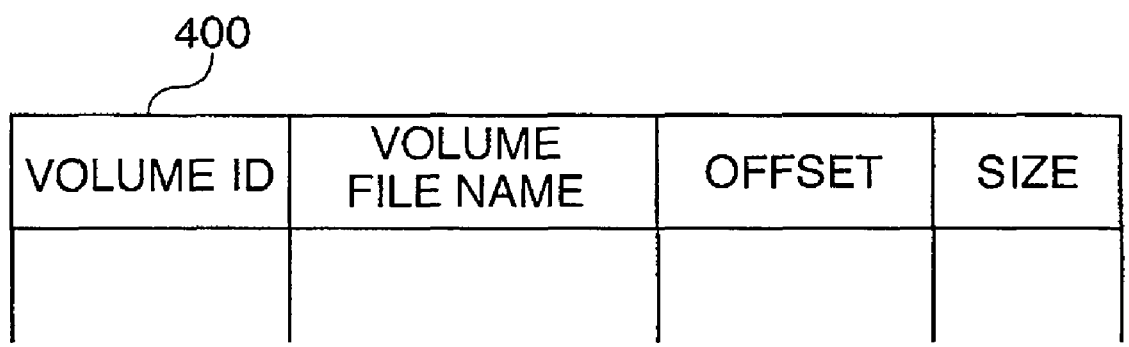
FIGS. 6A and 6B are diagrams showing the data structure of contents data stored in a volume storage section of the document management server and added/acquired by a volume processing section.
Figure 6B:
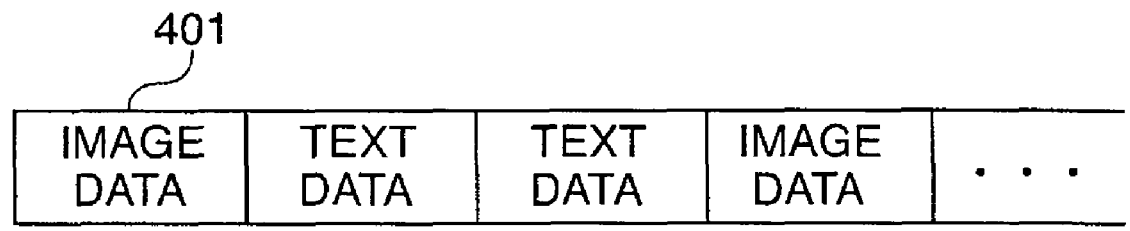

FIGS. 6A and 6B are views showing the data structures of contents data stored in the volume storage section 117 and added/acquired by the volume processing section 208. A volume management file 400 is comprised of volume IDs for identifying data, volume file names for identifying volume storage files in which data are stored, offsets which are positions at which data storage is started, and sizes of data. In a volume storage file 401, image data or text data as contents data are stored on a consecutive basis.

As shown in FIG. 4, the service server section 118 in the document management server 110 is comprised of a service communication section 209, the database communication section 210, the volume communication section 211, a cabinet document management section 212, an image processing section 213, and a service provider section 214.

Upon receiving a request command for the document management server 110 from the digital multifunction apparatus 130 via the network I/F 111 using SOAP protocol on HTTP protocol, the service communication section 209 sends the request to the service provider section 214. Upon receiving the result of processing of the request from the service provider section 214, the service communication section 209 sends it as a reply command to the digital multifunction apparatus 130.

The service provider section 214 performs processing in accordance with a request from the service communication section 209 and sends the result of processing of the request to the service communication section 209. When processing by the attribute management server section 112 and the volume server section 115 such as registration of document information and update and search of attributes is requested, the service provider section 214 sends the request to the cabinet document management section 212 and receives the result of processing of the request from the cabinet document management section 212. Also, in the case where contents data and log information of a job are received from the digital multifunction apparatus 130, the service provider section 214 receives the contents data and the log information from the service communication section 209. The service provider section 214 temporarily stores the received contents data and log information in the hard disk drive 239b and then sends a request to register the contents data and the log information to the cabinet document management section 212. The service provider section 214 receives the result of processing of the request from the cabinet document management section 212. In carrying out resolution conversion processing or data conversion processing of contents data, the service provider section 214 reads contents data from the hard disk drive 239b, carries out resolution conversion processing or data conversion processing of the contents data which is image data, sends a request to register the contents data and log information as documents to the cabinet document management section 212, and receives the result of processing of the request from the cabinet document management section 212.

The image processing section 213 carries out image processing such as expansion, compression, color space conversion, foundation skip, resolution conversion, rotation, region segmentation, or character recognition of image data in accordance with a request from the service provider section 214 or the cabinet document management section 212. The database communication section 210, volume communication section 211, and cabinet document management section 212 of the service server section 118 are identical in functional configuration with the database communication section 203, volume communication section 204, and cabinet document management section 202, respectively, of the document management client described above, and therefore description thereof is omitted.

Figure 7:
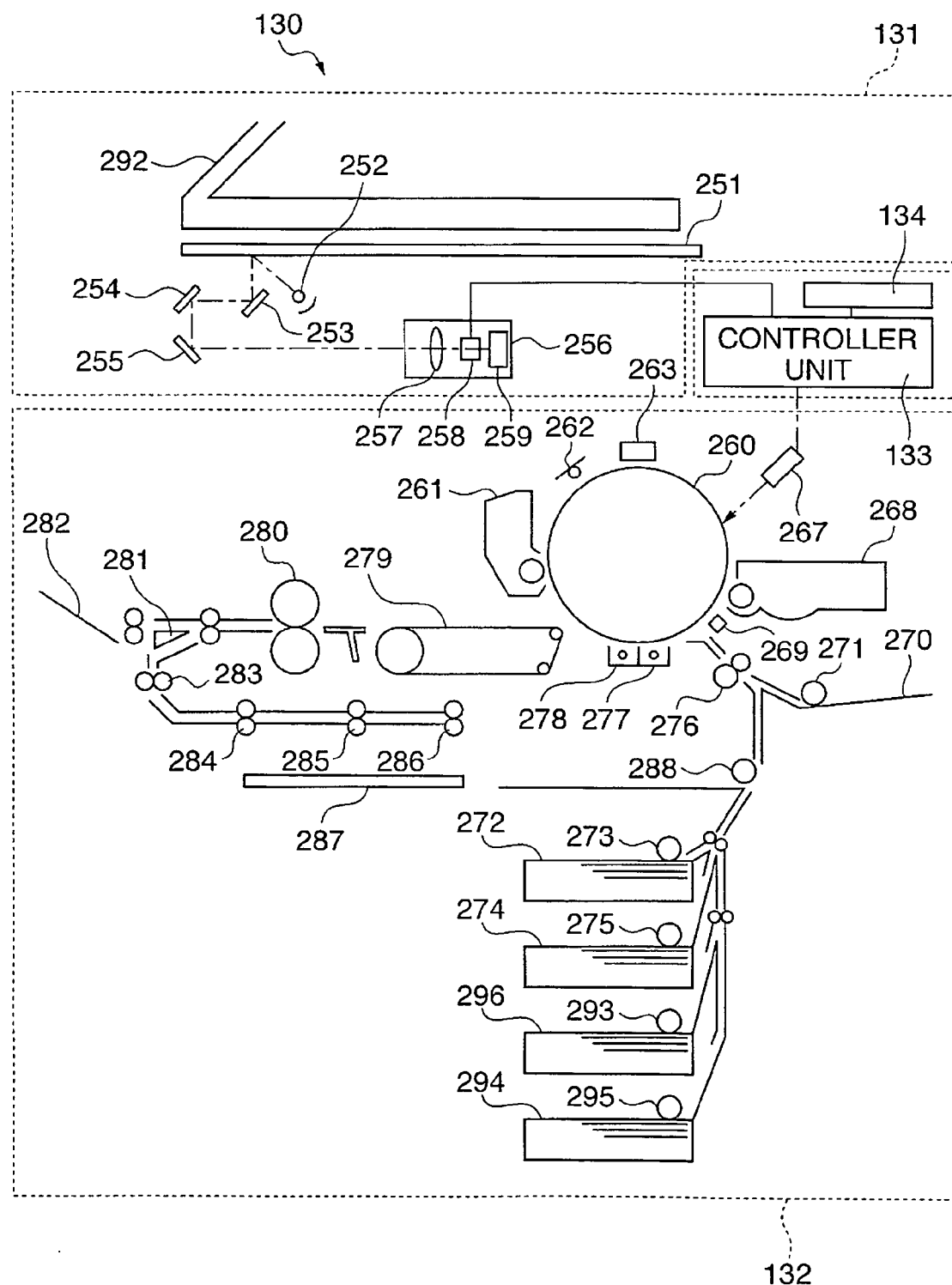
FIG. 7 is a longitudinal sectional view showing the internal construction of a digital multifunction apparatus appearing in FIG. 1.

FIG. 7 is a longitudinal sectional view showing the internal construction of the digital multifunction apparatus 130. In the scanner 131, originals fed from an automatic original feeder (original feeder) 292 are sequentially placed at a predetermined location on an original platen glass 251. An original illumination lamp 252 implemented by, for example, a halogen lamp exposes an original placed on the original platen glass 251 to light. Scanning mirrors 253, 254, and 255 housed in an optical scanning unit, not shown, guide reflected light from the original to a CCD unit 256 while moving back and forth. The CCD unit 256 is comprised of an image-forming lens 257 which makes the reflected light from the original form an image on an image pickup device, an image pickup device 258 comprised of, for example, a CCD, a CCD driver 259 which drives the image pickup device 258, and so forth. An image signal output from the image pickup device 258 is converted into, for example, 8-bit digital data and then input to the controller unit 133.

On the other hand, in the printer 132, a pre-exposure lamp 262 removes electricity from a photosensitive drum 260 in preparation for image formation. A primary charging unit 263 uniformly charges the photosensitive drum 260. A semiconductor laser 267 which is an exposure means exposes the photosensitive drum 260 to light to form an electrostatic latent image based on image data processed by the controller unit 133. A developing unit 268 contains a black developer (toner). A pre-transfer charging unit 269 applies high voltage to the photosensitive drum 260 before a toner image developed on the photosensitive drum 260 is transferred onto a sheet. Transfer sheets are fed into the apparatus from a manual sheet-feeding unit 270 and sheet-feeding units 272, 274, 296, and 294 by driving of sheet-feeding rollers 271, 273, 275, 293, and 295, respectively, and they are temporarily stopped at resist rollers 276 and then fed again in synchronization with timing in which writing of an image formed on the photosensitive drum 260 is started. A transfer charging unit 277 transfers the toner image developed on the photosensitive drum 260 onto the fed transfer sheet. A separation charging unit 278 separates the transfer sheet onto which the image has been transferred from the photosensitive drum 260. Toner remaining on the photosensitive drum 260 without being transferred onto the sheet is collected by a cleaner 261.

A conveying belt 279 conveys the transfer sheet on which the transfer process has been performed to a fixing unit 280, which fixes the image on the sheet by heating, for example. A flapper 281 switches the conveying path of the transfer sheet on which the fixing process has been performed between a path toward a sorter 282 and a path toward an intermediate tray 287. Feeding rollers 283 to 286 convey the transfer sheet on which the fixing process has been performed once to the intermediate tray 287 after inverting it (multiple) or without inverting it (double-sided). A re-feed roller 288 conveys the transfer sheet placed on the intermediate tray 287 again to the resist rollers 276. The controller unit 133 is comprised of a microcomputer, an image processing section, and so forth, and controls the above described image forming operation in accordance with instructions from the operating section 134.

Figure 8:
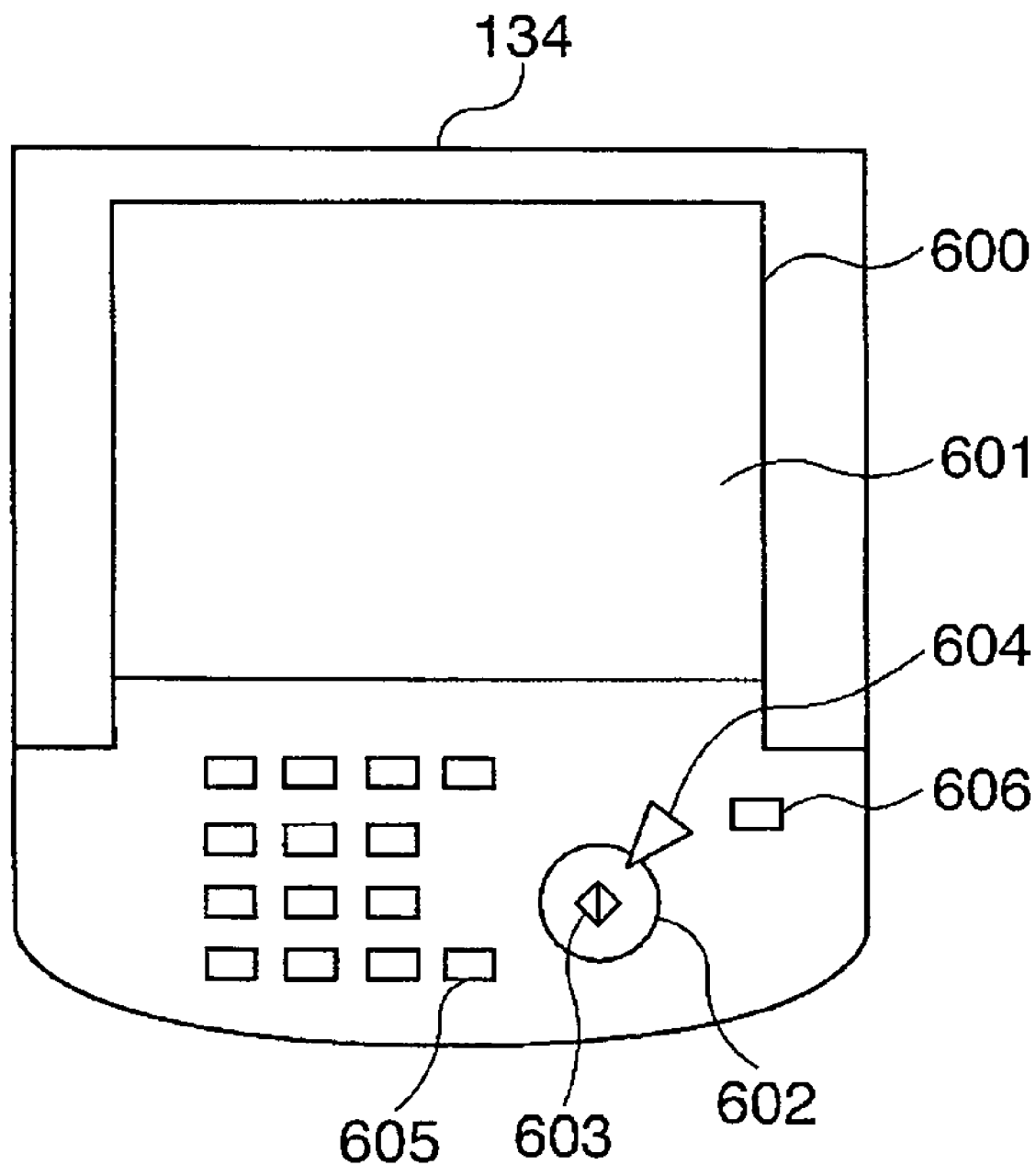
FIG. 8 is a view showing the external configuration of an operating section of the digital multifunction apparatus.

FIG. 8 is a view showing the external configuration of the operating section 134. The operating section 134 is comprised of an LCD display section 600 and various keys. The LCD display section 600 is constructed such that a touch panel sheet 601 is attached to the screen of an LCD, and displays operating screens and soft keys for the digital multifunction apparatus. When any of the displayed keys is depressed, the LCD display section 600 gives information on the position of the depressed key to a CPU 500 (see FIG. 9) of the controller unit 133. A start key 602 is depressed in starting reading an image on an original. Two-color LEDs 603 which emit green light and red light, respectively, are provided in the center of the start key 602, and whether or not the start key 602 is ready to be used can be known by the color of the lit LED. A stop key 604 is used in stopping operation when the apparatus is in operation. An ID key 605 is used to enter a user ID of a user. A reset key 606 is used in initializing settings of the operating section 134.

Figure 9:
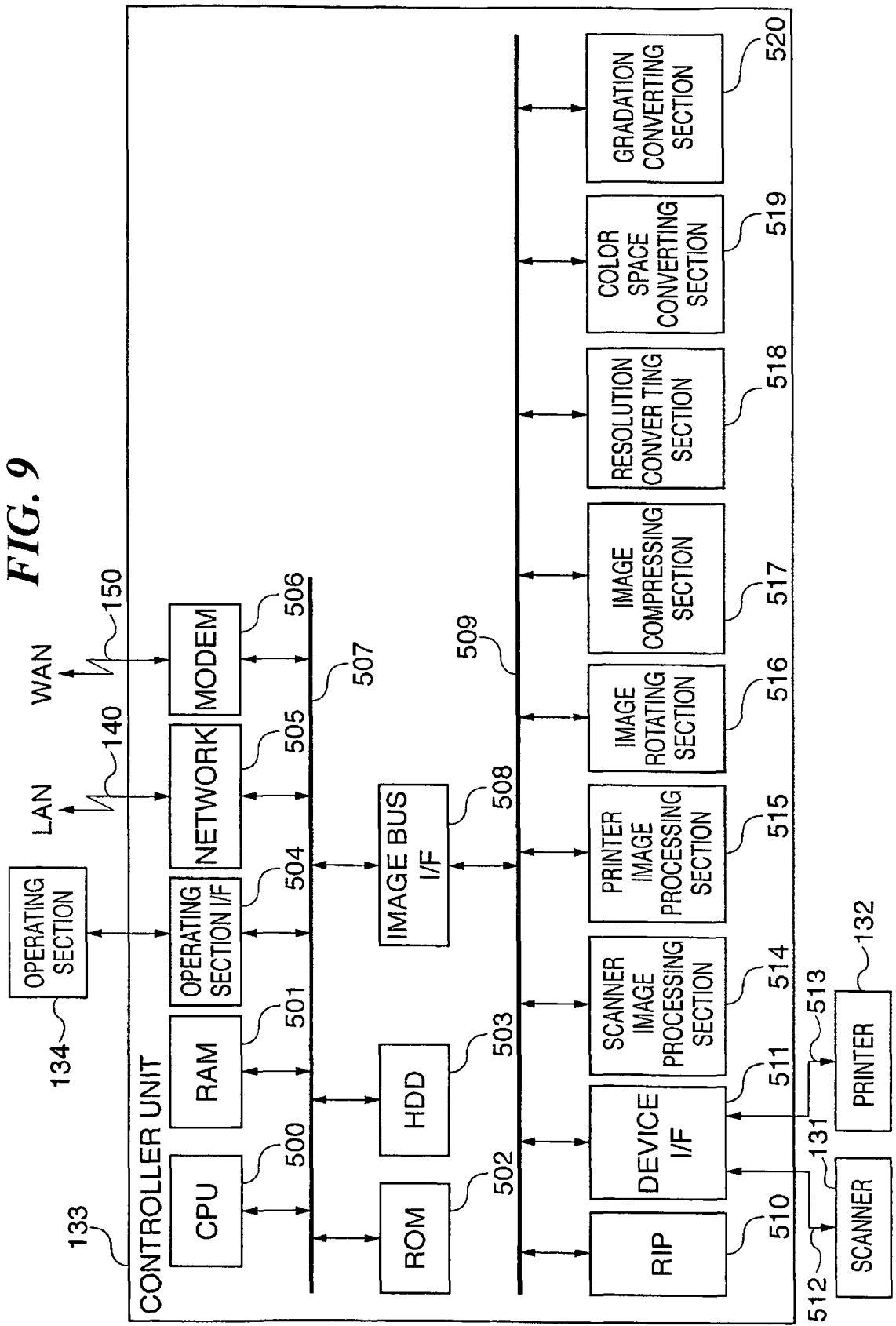
FIG. 9 is a diagram showing the hardware configuration of the digital multifunction apparatus.

FIG. 9 is a diagram showing the hardware configuration of the digital multifunction apparatus 130. The controller unit 133 is connected to the scanner section 131 which is an image input device and the printer section 132 which is an image output device, and also connected to the network (LAN) 140 and the public telephone line (WAN) 150, for inputting and outputting image information and device information.

The CPU 500, a ROM 502, a RAM 501, a hard disk drive 503, an operating section I/F 504, a network section 505, a modem 506, and an image bus I/F 508 are connected to a system bus 507 of the controller unit 133.

The CPU 500 controls the entire system. The RAM 501 is a system working memory for operation of the CPU 500 and is also an image memory (buffer memory) for temporarily storing input image data. The ROM 502 is a boot ROM which stores a system boot program. The hard disk drive (HDD) 503 stores system software, job contents data, log information, and so forth.

The operating section I/F 504 is an interface section to the operating section 134 and outputs screen data to be displayed on the operating section 134 to the operating section 134. The operating section I/F 504 has the function of transmitting information input by an operator via the operating section 134 to the CPU 500. The network section (Network) 505 is connected to the network (LAN) 140, for inputting and outputting information. The modem (MODEM) 506 is connected to the public telephone line (WAN) 150, for inputting and outputting image information.

The image bus (Image Bus) I/F 508 is a bus bridge that connects the system bus 507 and an image bus 509 which transfers image data at high speed to each other and carries out conversion of data structures. The image bus 509 is comprised of a PCI bus or an IEEE1394 bus.

On the other hand, the image bus I/F 508, a raster image processor 510, a device I/F section 511, a scanner image processing section 514, a printer image processing section 515, an image rotating section 516, an image compressing section 517, a resolution converting section 518, a color space converting section 519, and a gradation converting section 520 are connected to the image bus 509.

The raster image processor (RIP) 510 expands PDL codes into bitmap images. The device I/F section 511 connects the scanner section 131 and the printer section 132 with the controller unit 133 via an image input section interface 512 and a printing section interface 513 and converts image data for synchronizing/non-synchronizing.

The scanner image processing section 514 corrects, processes, and edits input image data. Also, the scanner image processing section 514 has the function of determining whether an original is a color original or a black-and-white original according to chroma signal (saturation signal) of an input image data, and holding the determination result. The printer image processing section 515 corrects, processes, and edits output image data.

The image rotating section 516 rotates image data and stores the same in the memory in conjunction with the scanner image processing section 514 at the same time when the image data is read from the scanner section 131, rotates image data stored in the memory and stores the same in the memory, or prints/outputs image data stored in the memory while rotating the same in conjunction with the printer image processing section 515.

The image compressing section 517 carries out expansion and compression processing of JPEG on multivalued image data and expansion and compression processing of JBIG, MMR, MR, and MH on binary image data. The resolution converting section 518 converts the resolution of image data stored in the memory and stores the resultant image data in the memory. The color space converting section 519 carries out matrix computation to convert, for example, YUV image data stored in the memory into Lab image data and stores the resultant image data in the memory.

The gradation converting section 520 converts, for example, 8-bit and 256-gradation image data stored in the memory into 1-bit and 2-gradation image data using an error diffusion method or the like and stores the resultant image data in the memory. It should be noted that the image rotating section 516, image compressing section 517, resolution converting section 518, color space converting section 519, and gradation converting section 520 may carry out processing in conjunction with one another; for example, in carrying out image rotation and resolution conversion of image data stored in the memory, it is possible to carry out these two kinds of processing without involving the memory.

Figure 10:
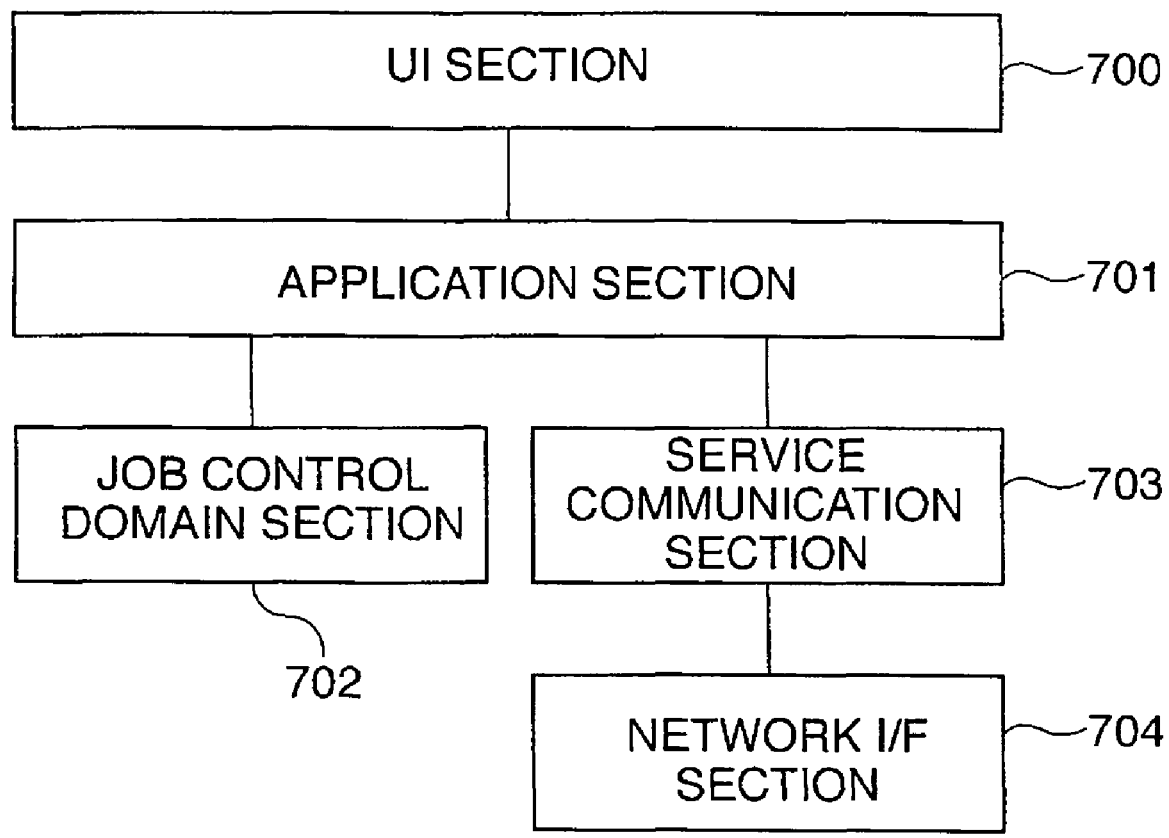
FIG. 10 is a diagram showing the functional configuration of software in a controller unit of the digital multifunction apparatus.

FIG. 10 is a diagram showing the functional configuration of software in the controller unit 133. A user interface (UI) section 700 supplies input information from an operator to an application section 701, receives the result of processing of the input information from the application section 701, and generates screen data which is to be displayed on the operating section 134.

The application section 701 carries out processing in accordance with requests from the user interface (UI) section 700. For example, when copy is requested, the application section 701 submits a copy job as well as specified copy settings to a job control domain section 702 and receives information on the status of the apparatus, the status of the job, and so forth from the job control domain section 702. Also, in sending contents data and log information of a job to the document management server 100, the application section 701 receives image data and log information of the job from the job control domain section 702, sends a request to send the contents data and the log information of the job to a service communication section 703, and receives the result of processing of the request.

Also, in carrying out resolution conversion or data conversion of contents data, the application section 701 receives image data and log information of a job from the job control domain section 702, executes resolution conversion or data conversion of the image data of the job, then sends a request to send contents data and log information to the service communication section 703, and receives the result of processing of the request.

The job control domain section 702 processes a plurality of jobs such as a scan job, a copy job, a print job, and a FAX job. For example, when a copy job is submitted, the job control domain section 702 effects the operation of the scanner section 131 and the printer section 132 and causes them to read an original and print image data thereof in accordance with designated copy settings. Also, the job control domain section 702 stores log information of the job comprised of device information, user information, and job information and the image data of the job in association with each other in the hard disk drive 503. The resolution of the job's image data is, for example, 600×600 dpi in the case of a copy job and 1200× 1200 dpi in the case of a print job.

The job control domain section 702 sends log information and image data stored in the hard disk drive 503 to the application section 101 in accordance with a request from the application section 701. The service communication section 703 sends a request command for the document management server 110 to the service communication section 209 of the document management server 110 via a network I/F 704 using SOAP protocol on HTTP protocol, and the service communication section 703 receives a reply to the request. The network I/F 704 is connected to the network 140, for carrying out processing using network protocols such as TCP/IP.

FIG. 11 is a view showing an XML schema of log information stored in the hard disk drive 503 of the controller unit 133. In the illustrated example, "logInformation" elements which represent the root of log information includes "deviceInformation" elements which represent device information such as a device name and an IP address, "userInformation" elements which represent user information such as a division ID and a user name, and "jobInformation" elements which represent job information such as a job type, a job name, and the date and time of starting.

Figure 12:
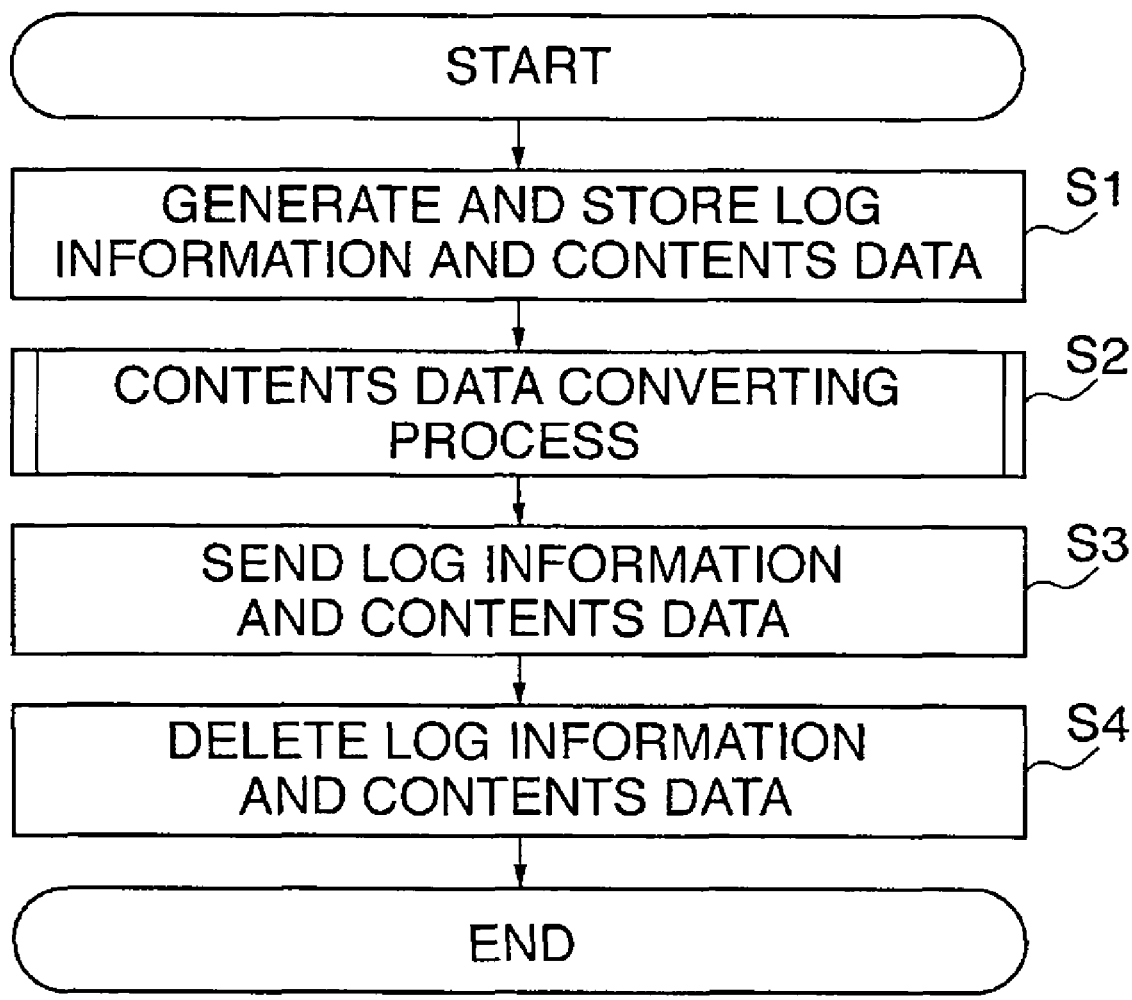
FIG. 12 is a flow chart showing the procedure of a process in which the digital multifunction apparatus performs processing on log information and contents data of a job.

A description will now be given of operation of the network document management system constructed as described above. FIG. 12 is a flow chart showing the procedure of a process in which the digital multifunction apparatus 130 performs processing on log information and contents data of a job. A processing program therefor is stored in the storage media (the ROM 502 and the hard disk drive 503) of the digital multifunction apparatus 130 and executed by the CPU 500 in response to starting of processing of a job such as a copy job or a print job.

First, when the digital multifunction apparatus 130 carries out job processing, the digital multifunction apparatus 130 generates log information indicative of the result of processing of the job and contents data indicative of contents of the job and stores them in the hard disk drive 503 (step S1). The contents data of the job generated and stored on this occasion is image data compressed using a compression technique such as JBIG.

Next, conversion of the stored contents data is carried out (step S2). In this contents data converting process, a process in which the contents data as image data is converted into image data having a predetermined resolution, or a process in which character recognition is carried out to convert the contents data as image data into text data is carried out as described later. It should be noted that how to convert resolution in the present embodiment will be described later. The contents data obtained by the conversion is stored in the hard disk drive 503, and the original contents data is deleted from the hard disk drive 503.

Thereafter, the log information and the contents data obtained by the conversion are sent to the document management server 110 (step S3), and the log information and the contents data are deleted from the hard disk drive 503 (step S4), followed by termination of the process. It should be noted that as described later, in the case where conversion of contents data is carried out by the document management server 110, not by the digital multifunction apparatus 130, the process in the step S2 is not carried out.

Figure 13:
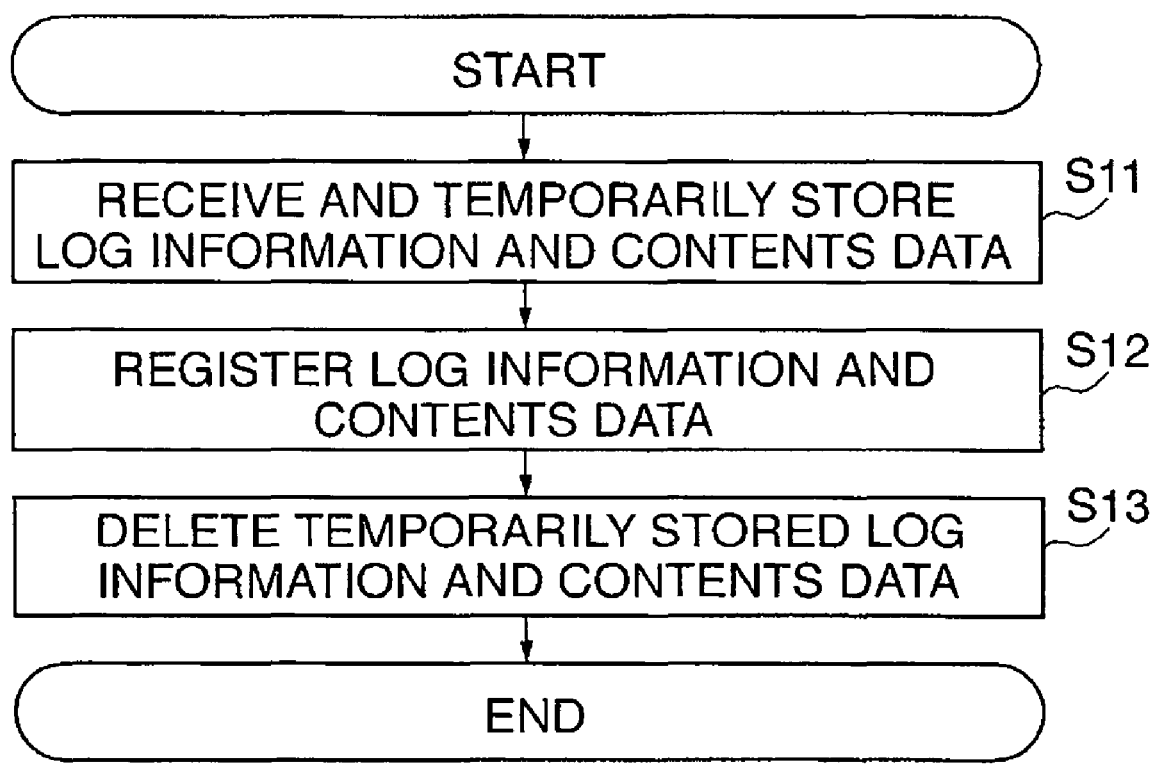
FIG. 13 is a flow chart showing the procedure of a process in which the document management server performs processing on log information and contents data of a job.

FIG. 13 is a flow chart showing the procedure of a process in which the document management server 110 performs processing on log information and contents data of a job. A processing program therefor is stored in the external storage media 239 of the document management server 110 and is loaded temporarily into the RAM 233 and then executed by the CPU 231 in response to receipt of an advanced order for data transfer from the digital multifunction apparatus 130. First, log information and contents data of a job are received from the digital multifunction apparatus 130 and temporarily stored in a predetermined area of the hard disk drive 239b (step S11). The log information and the contents data are registered in the attribute storage section 114 of the attribute management server section 112 and the volume storage section 117 of the volume server section 115, respectively (step S12), and the temporarily stored log information and contents data are deleted from the predetermined area of the hard disk drive 239b (step S13), followed by termination of the process.

Figure 14:
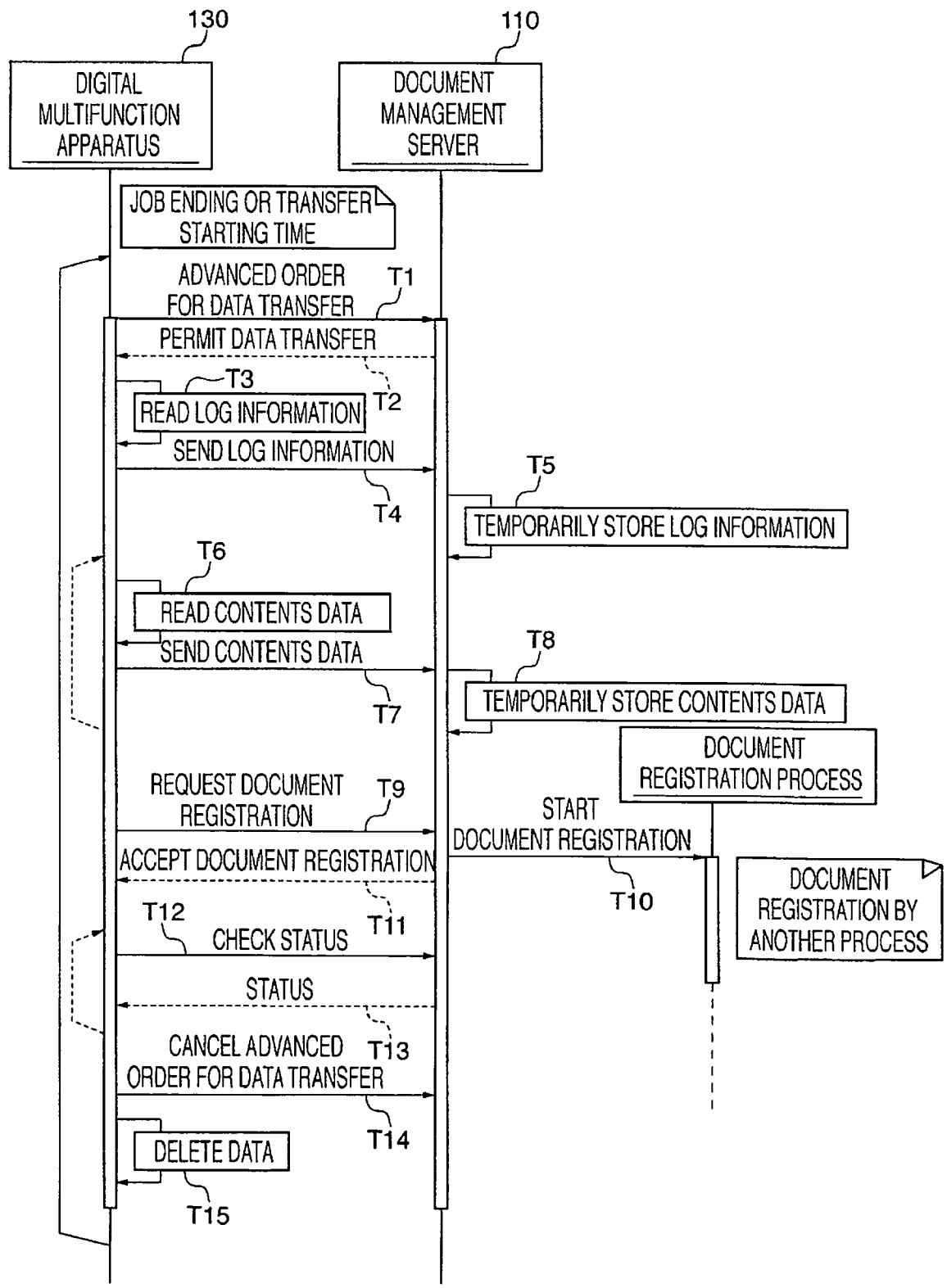
FIG. 14 is a diagram showing the flow of data transfer processing performed between the digital multifunction apparatus and the document management server.

FIG. 14 is a diagram showing the flow of data transfer processing performed between the digital multifunction apparatus 130 and the document management server 110. When job execution processing is completed, or when a timer reaches a transmission time set in advance, the digital multifunction apparatus 130 starts data transfer and sends an advanced order for data transfer to the document management server 110 (T1). Upon receipt of the advanced order for data transfer, the document management server 110 checks the number of connections and sends a permission to transfer data to the digital multifunction apparatus 130 when data transfer can be accepted (T2).

Upon receipt of the permission to transfer data, the digital multifunction apparatus 130 reads log information of a job stored in the hard disk drive 503 (T3) and sends the log information to the document management server 110 (T4). The document management server 110 temporarily stores the received log information in a predetermined area of the hard disk drive 239b (T5). Thereafter, the digital multifunction apparatus 130 reads contents data (contents data of which resolution has been converted) of one page in the job stored in the hard disk drive 503 (T6) and sends the contents data to the document management server 110 (T7). The document management server 110 temporarily stores the received contents data in a predetermined area of the hard disk drive 239b (T8). After repeatedly carrying out the processing from T6 to T8 with respect to all the pages, the digital multifunction apparatus 130 sends a document registration request to the document management server 110 (T9).

Upon receipt of the document registration request, the document management server 110 starts carrying out document registration by another process (T10) and immediately sends an acceptance of the document registration request to the digital multifunction apparatus 130 (T11). The digital multifunction apparatus 130 makes an inquiry of the document management server 110 about whether or not the document registration processing has been completed at regular time intervals (T12) and receives replies to the inquiries from the document management server 110 (T13). After the document registration processing is completed, the digital multifunction apparatus 130 sends a cancellation of the advanced order for data transfer to the document management serer 110 (T14) and deletes the log information and the contents data of which transfer has been completed from the hard disk drive 503 (T15). The processing from T1 to T15 is repeatedly carried out until the transfer of log information and contents data of all jobs is completed or until a transfer ending time.

Figure 15:
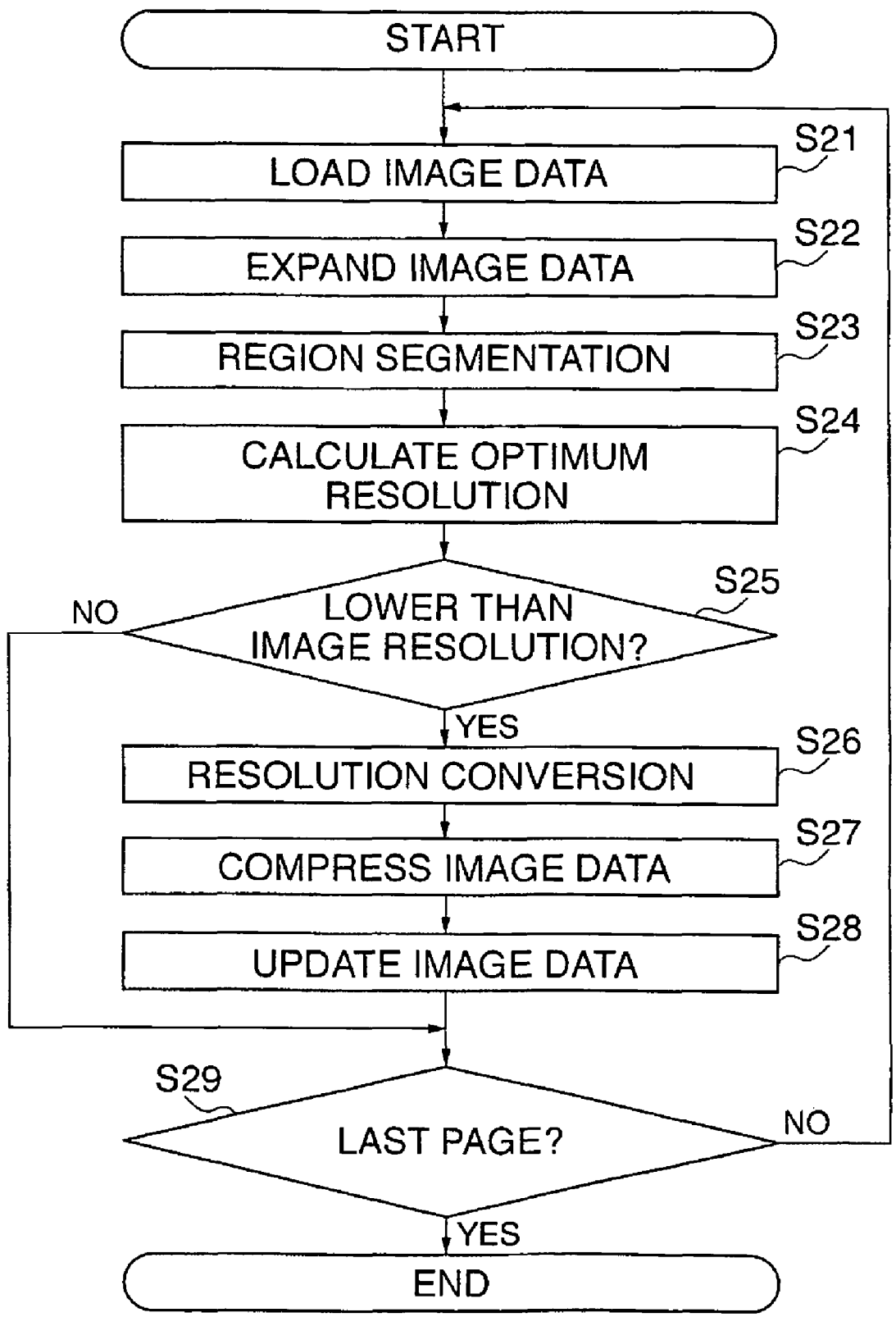
FIG. 15 is a flow chart showing the procedure of a contents data converting process in a step S2 in the process of FIG. 12.
Figure 22:
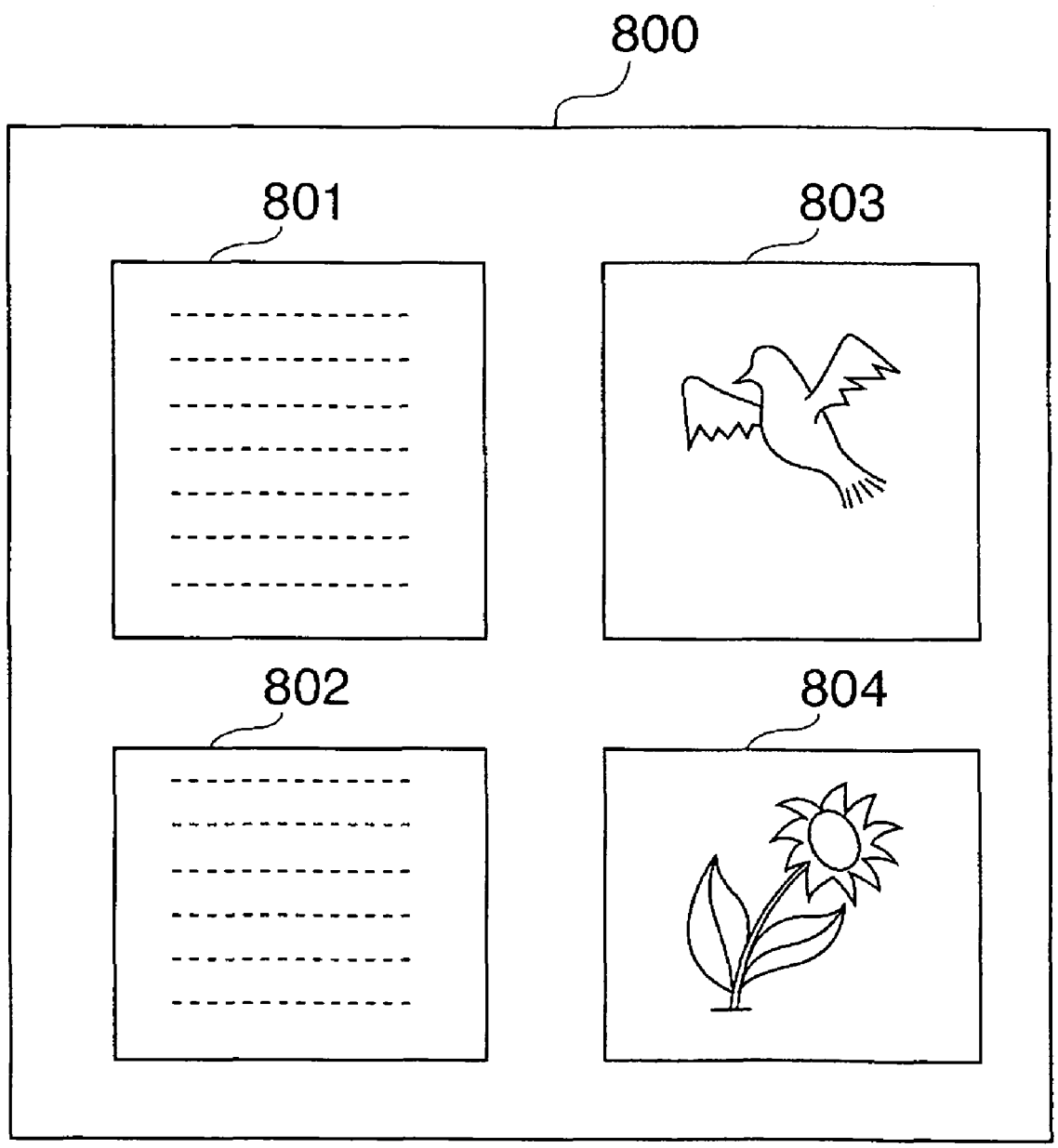
FIG. 22 is a view useful in explaining region segmentation of image data.
Figure 23:
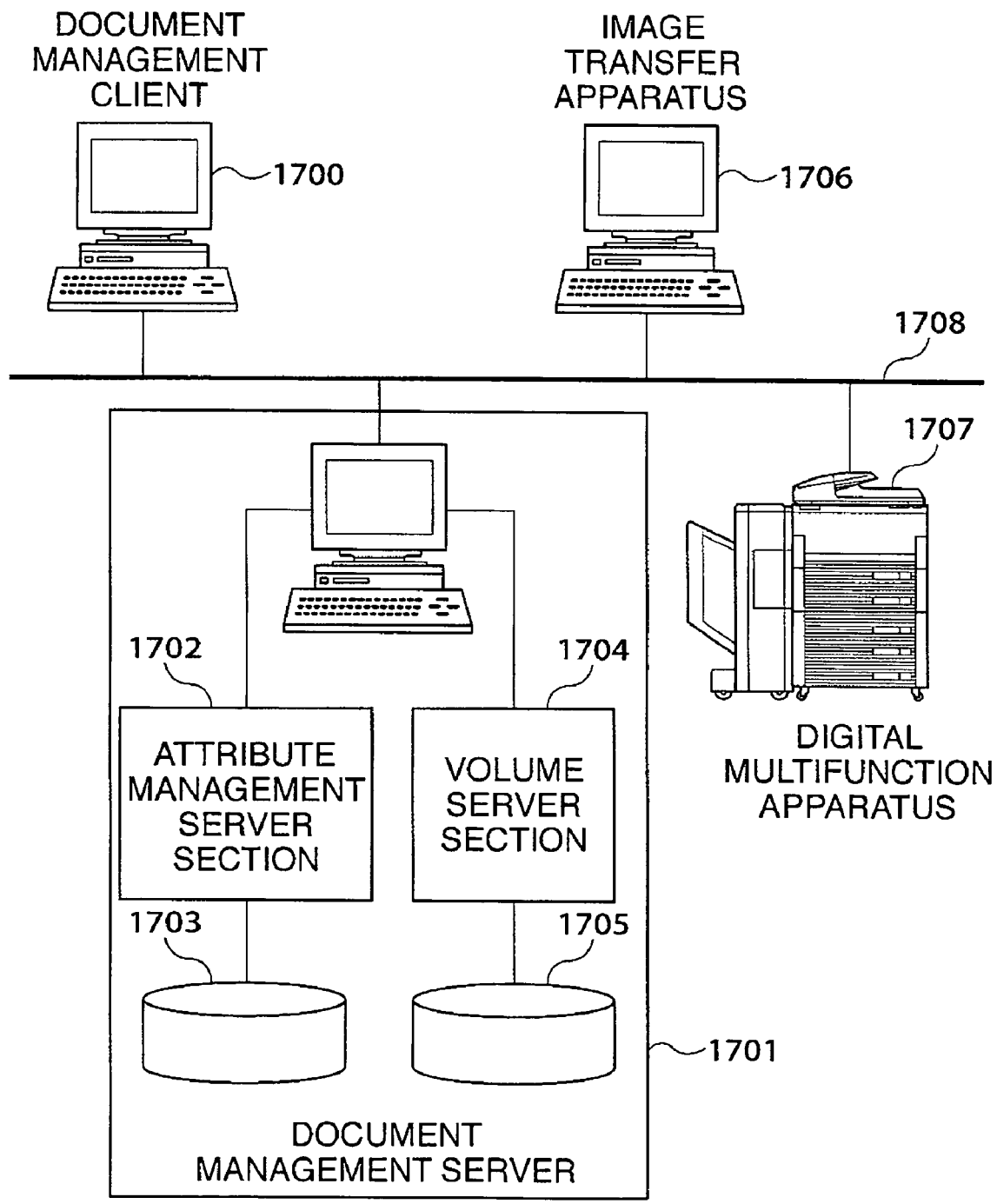
FIG. 23 is a diagram showing the arrangement of a conventional network document management system.

FIG. 15 is a flow chart showing the procedure of the contents data converting process in the step S2 in the process of FIG. 12. This converting process is carried out after generation and storage of log information and contents data of an executed job (for example, in the case of a print job, contents data means image data which represents contents to be printed) is completed. First, image data (for example, in the case of a print job, image data to be printed) of one page of contents data stored in the hard disk drive 503 is loaded into the memory (RAM 501) (step S21) and expanded according to an image data compression technique such as JBIG (step S22). Region segmentation of the expanded image data is carried out to extract the average character height of each line in a character region (step S23). Here, the region segmentation of image data is a process in which an image is segmented into regions based on the types of contents of the image. For example, an image is segmented into regions corresponding to texts, graphics, tables, etc. FIG. 22 is a view useful in explaining region segmentation of image data. In FIG. 22, text regions 801 and 802 and graphics regions 803 and 804 exist in image data 800. A variety of region segmentation methods have already been proposed; for example, as a method to segment image data into text regions, a region fill method in which text regions are segmented by expanding each black pixel in image data in horizontal and vertical directions up to adjacent one or more white pixels to fill the image data, and a region segmentation method using a K-mean algorithm involving obtaining regions step by step by repeatedly distributing pixels in an image to appropriate regions until the image is brought to a predetermined state.

Figure 21A:
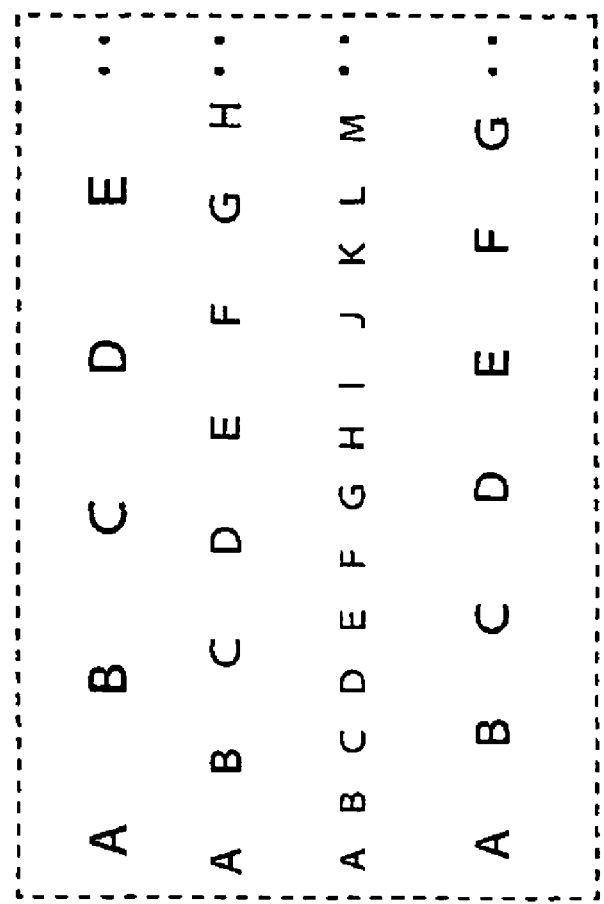
FIGS. 21A and 21B are diagrams showing image data of a character region and the distribution of black pixels in the character region, respectively.
Figure 21B:
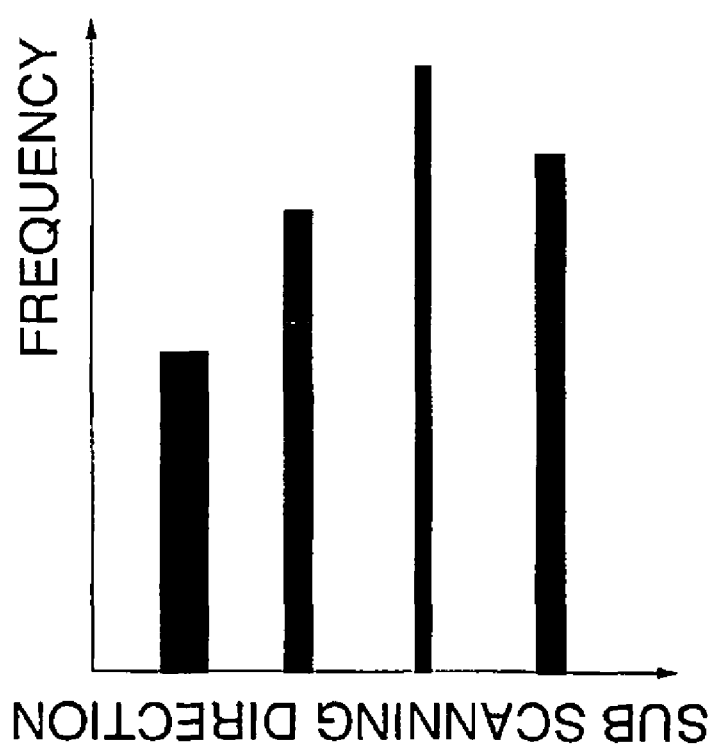

Also, a variety of techniques have been known as a technique for extracting the average character height of each line in a character region. An example of such techniques will now be described. FIG. 21A is a view showing image data in a character region, and FIG. 21B is a view showing the distribution of black pixels in this character region. A black pixel distribution in which the counts (frequencies) of black pixels projected in a main scanning direction (the direction of character lines) are shown along a sub scanning direction (the direction of character rows) is obtained with respect to image data in a binary-coded character region. In this black pixel distribution, parts where the frequency of black pixels is high in the sub scanning direction are determined as being character line data, and the average character height of each line is extracted from the character line data.

The resolution (the optimum resolution) suitable for recognition of characters in a line of which extracted average character height is the minimum is calculated (step S24). The optimum resolution suitable for character recognition means a necessary and sufficient resolution that can achieve a predetermined recognition rate when character recognition is carried out on characters of a predetermined character size (point size). The optimum resolution varies depending on the characteristics of character recognition processing; for example, in the case of double-byte characters, a resolution of 400*400 dpi for a character size of 6 point, a resolution of 300*300 dpi for a character size of 8 point, and a resolution of 200*200 dpi for a character size of 12 to 48 point. A table showing the character sizes (point sizes) and the optimum resolutions is stored in advance in the memory (ROM 502) of the digital multifunction apparatus 130 so that it can be referred to anytime.

It is determined whether or not the calculated optimum resolution is less than the resolution of the image data (step S25). If the optimum resolution is less than the resolution of the image data, the resolution of the image data is converted into the optimum resolution (step S26). The image data is compressed again using a compression technique such as JBIG (step S27), and the resultant image data is stored in a predetermined area of the hard disk drive 503 and the original data is deleted from a predetermined area of the hard disk drive 503 (step S28). On the other hand, if the calculated optimum resolution is not less than the resolution of the image data, the steps S26 to S28 are skipped, and the process proceeds to a step S29. It is then determined whether or not the page of the image data loaded in the step S21 is the last page (step S29). The processing in the steps S21 to S29 is repeatedly carried out until it is determined that the loaded page of the image data is the last page. When it is determined that the loaded page of the image data is the last page, the process is terminated.

As described above, with the network document management system according to the first embodiment, it possible to reduce the space used in the hard disk drive 239b of the document management server 110 (that is, the attribute storage section 114 of the attribute management server section 112 and the volume storage section 117 of the volume server section 115). Also, it is possible to shorten the image data transmission time period and lighten the load on the network in transferring image data via the network 140.

Next, a description will be given of a second embodiment of the present invention.

The hardware configuration of a network document management system according to the second embodiment is the same as that of the network document management system according to the above described first embodiment, and therefore description thereof is omitted. A description will now be given of a contents data converting process carried out by the digital multifunction apparatus, which is different from the contents data converting process according to the first embodiment.

Figure 16:
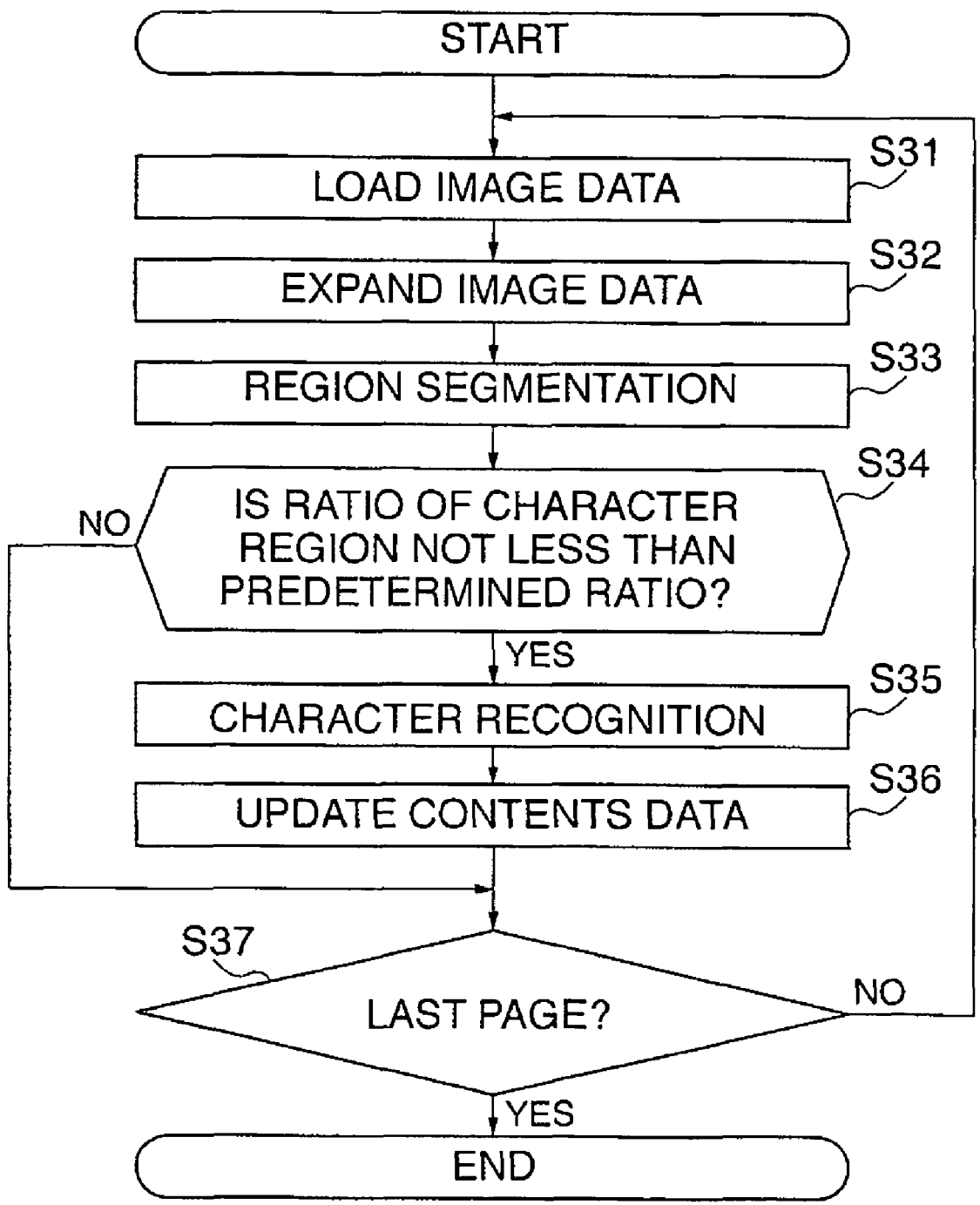
FIG. 16 is a flow chart showing the procedure of a contents data converting process in the step S2 in the process of FIG. 12, which is carried out in a second embodiment of the present invention.

FIG. 16 is a flow chart showing the procedure of a contents data converting process in the step S2 in the process of FIG. 12, which is carried out in the second embodiment. This process is carried out after generation and storage of log information and contents data are completed. The second embodiment is characterized in that conversion of contents data (image data) is carried out according to the ratio of a character region.

First, image data of one page of contents data stored in the hard disk drive 503 is loaded into the memory (RAM 501) (step S31) and expanded according to an image data compression technique such as JBIG (step S32). Region segmentation of the expanded image data is carried out to extract a character region and an image region (step S33). In extracting a character region and an image region using region segmentation, a region fill method, a region segmentation method using a K-mean algorithm, and so forth may be used as is the case with the first embodiment.

It is then determined whether or not the ratio of the character region relative to the expanded image data is not less than a predetermined ratio (step S34). The predetermined ratio may be the ratio of a character region relative to the entire area of the image data (for example 50%), or may be the ratio of a character region relative to the area of image data except the character region. The predetermined ratio is set by empirically calculating in advance a threshold value at which it is determined that a character region is preferably managed as text data since the character region is large (such as a threshold value at which it is determined that a character region is more important than a non-character region of image data, or a threshold value at which the volume of text data is large enough to be handled with ease).

If the ratio of the character region is not less than the predetermined ratio, character recognition is carried out on the image data to extract text data from the image data (step S35). A variety of character recognition techniques are known; for example, character pattern data on a character-by-character basis is cut from character line data obtained in extracting the average character height of each line as described above and character row data obtained in a like manner, and character recognition is carried out based on the similarity of the cut character pattern data to character pattern data registered in advance in a character dictionary so as to extract text data. The extracted text data is then stored as contents data in the hard disk drive 503, and the original image data is deleted from the hard disk drive 503 (step S36).

On the other hand, if the ratio of the character region is less than the predetermined ratio, the steps S35 and S36 are skipped, and the process proceeds to a step S37. It is then determined whether or not the page of the image data loaded in the step S31 is the last page (step S37). The processing in the steps S31 to S37 is repeatedly carried out until it is determined that the loaded page of the image data is the last page, and when it is determined that the loaded page of the image data is the last page, the present process is terminated.

As described above, with the network document management system according to the second embodiment, it is possible to determine whether to convert image data of contents data to text data according to the size of a character region in the image data, thereby further reducing the space used in the hard disk drive 239b of the document management server 110 (that is, the attribute storage section 114 of the attribute management server section 112 and the volume storage section 117 of the volume server section 115). Also, it is possible to further shorten the image data transmission time period and lighten the load on the network in transferring image data via the network.

Although in the above described second embodiments, if it is determined in the step S34 that the ratio of the character region is less than the predetermined percentage, no processing is carried out and the process proceeds to the step S37, the present invention is not limited to this, but if the resolution of the image data is higher than a predetermined resolution, the process may proceed to the step S37 after the resolution of the image data is converted (into a low resolution).

Next, a description will be given of a third embodiment of the present invention.

The hardware configuration of a network document management system according to the third embodiment is the same as that of the network document management system according to the above described first embodiment, and therefore description thereof is omitted. A description will be given below of a contents data converting process carried out by the digital multifunction apparatus, which is different from the contents data converting process according to the first embodiment.

Figure 17:
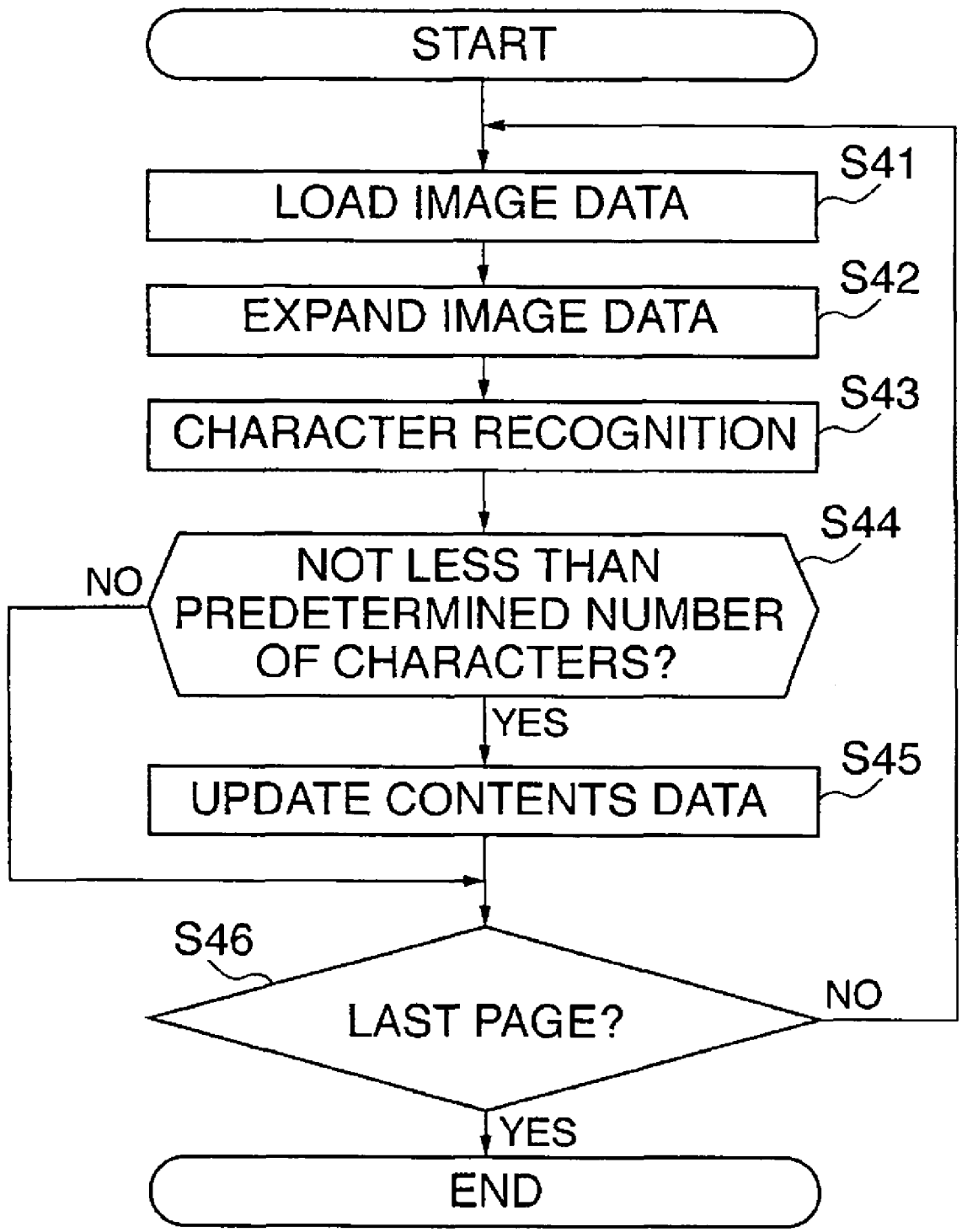
FIG. 17 is a flow chart showing the procedure of a contents data converting process in the step S2 in the process of FIG. 12, which is carried out in a third embodiment of the present invention.

FIG. 17 is a flow chart showing the procedure of a contents data converting process in the step S2 in the process of FIG. 12, which is carried out in the third embodiment. This process is carried out after generation and storage of log information and contents data are completed. The third embodiment is characterized in that conversion of contents data (image data) is carried out according to the number of characters.

First, image data of one page of contents data stored in the hard disk drive 503 is loaded into the memory (RAM 501) (step S41) and expanded according to an image data compression technique such as JBIG (step S42). Preprocessing for character recognition (character rectangular regions are extracted on a character-by-character basis) is performed on the image data to extract character rectangles (step S43). It is then determined whether or not the number of extracted character rectangles (i.e. the number of characters) is not less than a predetermined number of characters (step S44). As the predetermined number of characters, for example, a threshold value at which it is determined that image data is preferably managed as text data since the number of characters is large is set in advance. It should be noted that this threshold value may be determined in dependence on whether the volume of text data is enough or not, or may be determined in dependence on whether it is more preferable to keep image data as it is than to increase the load on character recognition.

If the number of extracted character rectangles is not less than the predetermined number of characters, character recognition is carried out on the extracted character rectangles to obtain text data, the text data thus obtained is stored as contents data in the hard disk drive 503, and the original image data is deleted from the hard disk drive 503 (step S45). On the other hand, if the number of extracted characters is less than the predetermined number of characters, the step S45 is skipped, and the process proceeds to a step S46. It is then determined whether or not the page of the image data loaded in the step S41 is the last page (step S46). The processing in the steps S41 to S46 is repeatedly carried out until it is determined that the loaded page of the image data is the last page, and when it is determined that the loaded page of the image data is the last page, the present process is terminated.

As described above, as is the case with the second embodiment described above, with the network document management system according to the third embodiment, it is possible to determine whether to convert image data into text data according to the number of characters in the image data, thereby reducing the space used in the hard disk drive 239b of the document management server 110 (that is, the attribute storage section 114 of the attribute management server section 112 and the volume storage section 117 of the volume server section 115). Also, it is possible to shorten the data transmission time period and lighten the load on the network in transferring text data instead of image data.

Although in the above described third embodiment, preprocessing for character recognition (character rectangle extraction processing) is carried out in the step S43, this is not limitative, but in the step S43, dictionary matching processing may be carried out to output character recognition results.

Next, a description will be given of a fourth embodiment of the present invention.

The hardware configuration of a network document management system according to the fourth embodiment is the same as that of the network document management system according to the above described first embodiment, and therefore description thereof is omitted. A description will be given below of a contents data converting process carried out by the digital multifunction apparatus, which is different from the contents data converting process according to the first embodiment.

Figure 18:
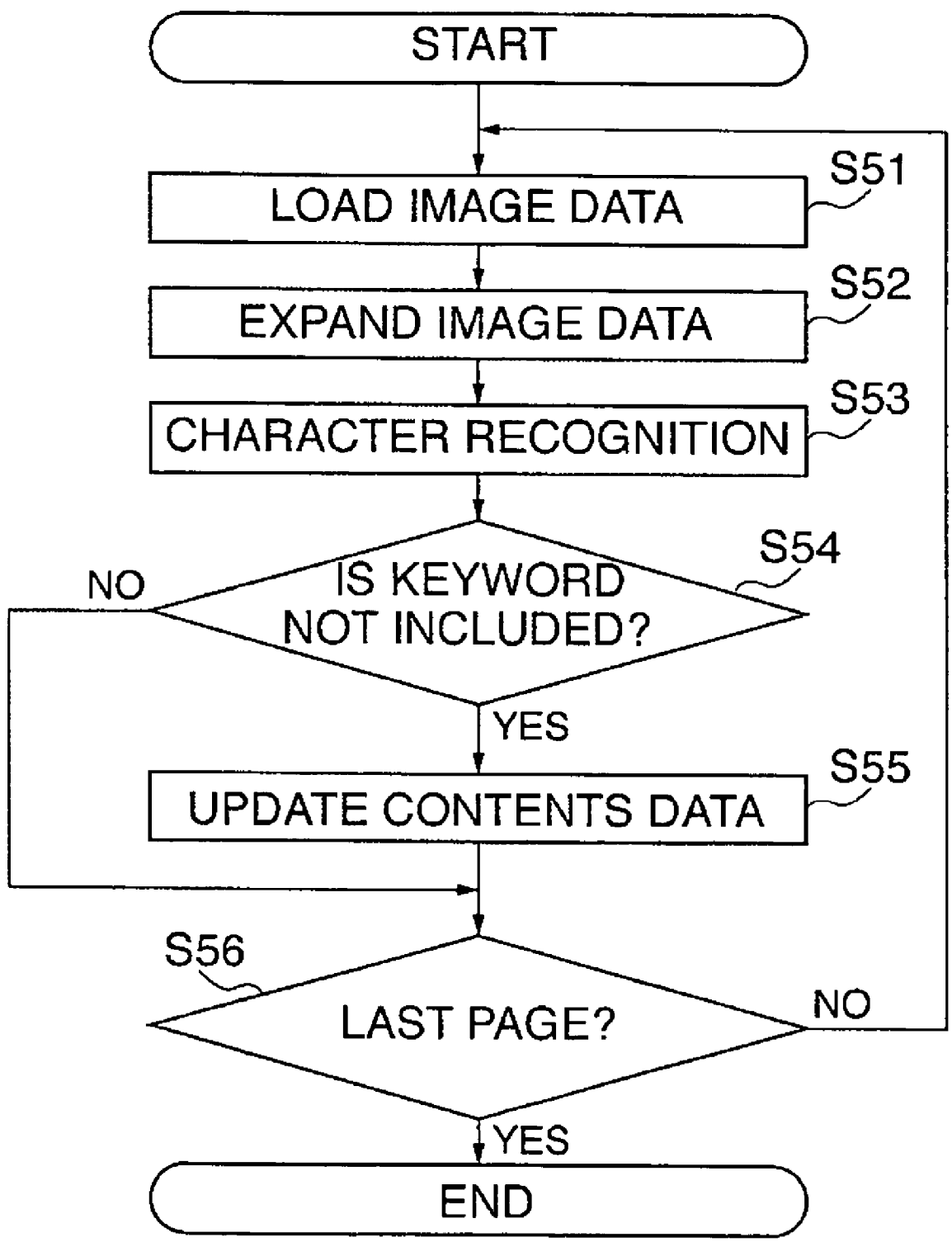
FIG. 18 is a flow chart showing the procedure of a contents data converting process in the step S2 in the process of FIG. 12, which is carried out in a fourth embodiment of the present invention.

FIG. 18 is a flow chart showing the procedure of a contents data converting process in the step S2 in the process of FIG. 12, which is carried out in the fourth embodiment. This process is carried out after generation and storage of log information and contents data are completed. The fourth embodiment is characterized in that conversion of contents data (image data) is carried out according to keywords.

First, image data of one page of contents data stored in the hard disk drive 503 is loaded into the memory (RAM 501) (step S51) and expanded according to an image data compression technique such as JBIG (step S52). Character recognition is then carried out on the image data to extract text data from the image data (step S53). The character recognition is carried out in the same manner as in the second embodiment described above. It is then determined whether or not the extracted text data includes a predetermined keyword (step S54). The predetermined keyword is a term that is preferably not converted into text data and is, for example, a term "design drawing" or "drawing" which indicates that a design drawing or the like which would lower the value of the contents data if converted into text data is included, or a specific heading.

If the predetermined keyword is not included in the extracted text data, the extracted text data is stored in the hard disk drive 503, and the original image data is deleted from the hard disk drive 503 (step S55). On the other hand, if the predetermined keyword is included in the extracted text data, the step S55 is skipped, and the process proceeds to a step S56. It is then determined whether or not the page of the image data loaded in the step S51 is the last page (step S56). The processing in the steps S51 to S56 is repeatedly carried out until it is determined that the loaded page of the image data is the last page, and when it is determined that the loaded page of the image data is the last page, the present process is terminated.

As described above, with the network document management system according to the fourth embodiment, it is possible to convert only image data which is worthwhile being converted into text data into text data, thereby reducing the space used in the hard disk drive 239b of the document management server 110 (that is, the attribute storage section 114 of the attribute management server section 112 and the volume storage section 117 of the volume server section 115). Also, it is possible to shorten the data transmission time period and lighten the load on the network in the case of transferring text data via the network.

Next, a description will be given of a fifth embodiment of the present invention.

The hardware configuration of a network document management system according to the fifth embodiment is the same as that of the network document management system according to the above described first embodiment, and therefore description thereof is omitted. A description will be given below of a contents data converting process carried out by the digital multifunction apparatus, which is different from the contents data converting process according to the first embodiment.

Figure 19:
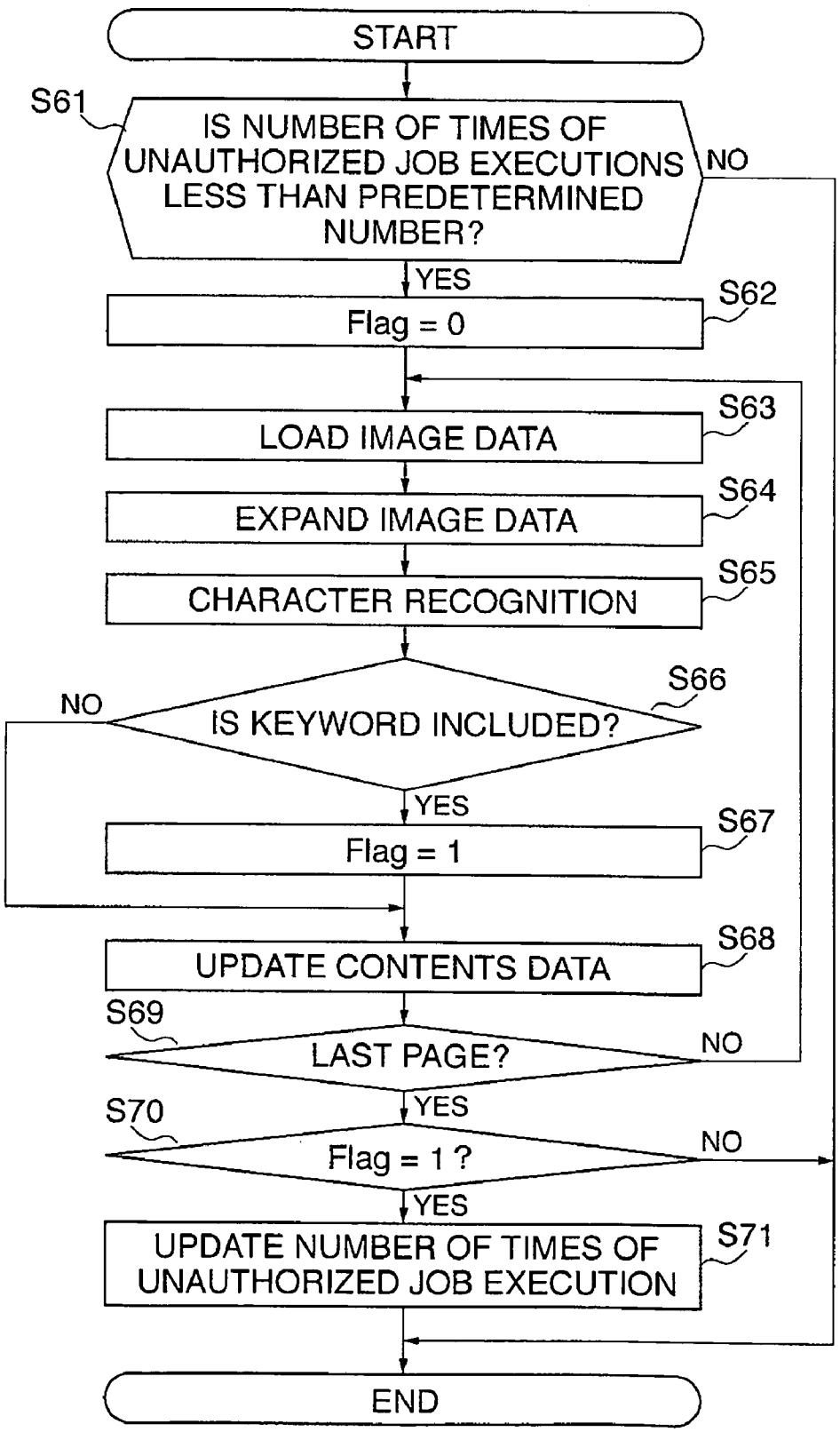
FIG. 19 is a flow chart showing the procedure of a contents data converting process in the step S2 in the process of FIG. 12, which is carried out in a fifth embodiment of the present invention.

FIG. 19 is a flow chart showing the procedure of a contents data converting process in the step S2 in the process of FIG. 12, which is carried out in the fifth embodiment. This process is carried out after generation and storage of log information and contents data are completed. The fifth embodiment is characterized in that conversion of contents data (image data) is carried out according to the number of unauthorized job executions.

First, it is determined whether or not the number of unauthorized job executions by a user who has effected the execution of a job is less than a predetermined number of unauthorized job executions (step S61). The predetermined number of unauthorized job executions may be arbitrarily determined and, for example, may be set to a value 1. If the number of unauthorized job executions by the user who has effected the execution of the job is not less than the predetermined number of unauthorized job executions, image data is kept unchanged as contents data without being converted into text data, followed by termination of the present process.

On the other hand, if the number of unauthorized job executions by the user who has effected the execution of the job is less than the predetermined number of unauthorized job executions, a value of an unauthorized job execution flag is set to "0" (step S62). The unauthorized job execution flag (Flag) is stored in the RAM 501 of the controller unit 133. Next, image data of one page of contents data stored in the hard disk drive 503 is loaded into the memory (RAM 501) (step S63) and expanded according to an image data compression technique such as JBIG (step S64).

Character recognition is carried out on the image data to extract text data from the image data (step S65). The character recognition is carried out in the same manner as in the second embodiment described above. It is then determined whether or not a predetermined keyword is included in the extracted text data (step S66). The predetermined keyword is, for example, a term "internal use only", "copy inhibit", or "secret document" which indicates that the execution of a copy job or a print job is unauthorized. If the predetermined keyword is included in the extracted text data, the value of the unauthorized job execution flag is set to "1" (step S67). The extracted text data is stored in the hard disk drive 503 as contents data, and the original image data is deleted from the hard disk drive 503 (step S68).

On the other hand, if the predetermined keyword is not included in the extracted text data, the step S67 is skipped, and the process proceeds to a step S69. It is then determined whether or not the page of the image data loaded in the step S63 is the last page (step S69). The processing in the steps S63 to S69 is repeatedly carried out until it is determined that the loaded page of the image data is the last page. When it is determined in the step S69 that the loaded page of the image data is the last page, it is determined whether or not the unauthorized job execution flag assumes "1" (step S70). If the unauthorized job execution flag assumes "1", the number of unauthorized job executions by the user who has effected the execution of the job is increased by one (step S71), followed by termination of the present process. On the other hand, if the unauthorized job execution flag does not assume "1", the step S71 is skipped, and the present process is terminated.

As described above, with the network document management system according to the fifth embodiment, it is possible to inhibit conversion of image data into text data in executing an unauthorized job, thereby improving security.

It should be understood that the present invention is not limited to the embodiments described above, but various changes in or to the above described embodiments may be possible without departing from the spirits of the present invention. That is, the present invention can apply to any arrangements capable of having functions of arrangements of claims or the functions of the above described embodiments.

Figure 20:
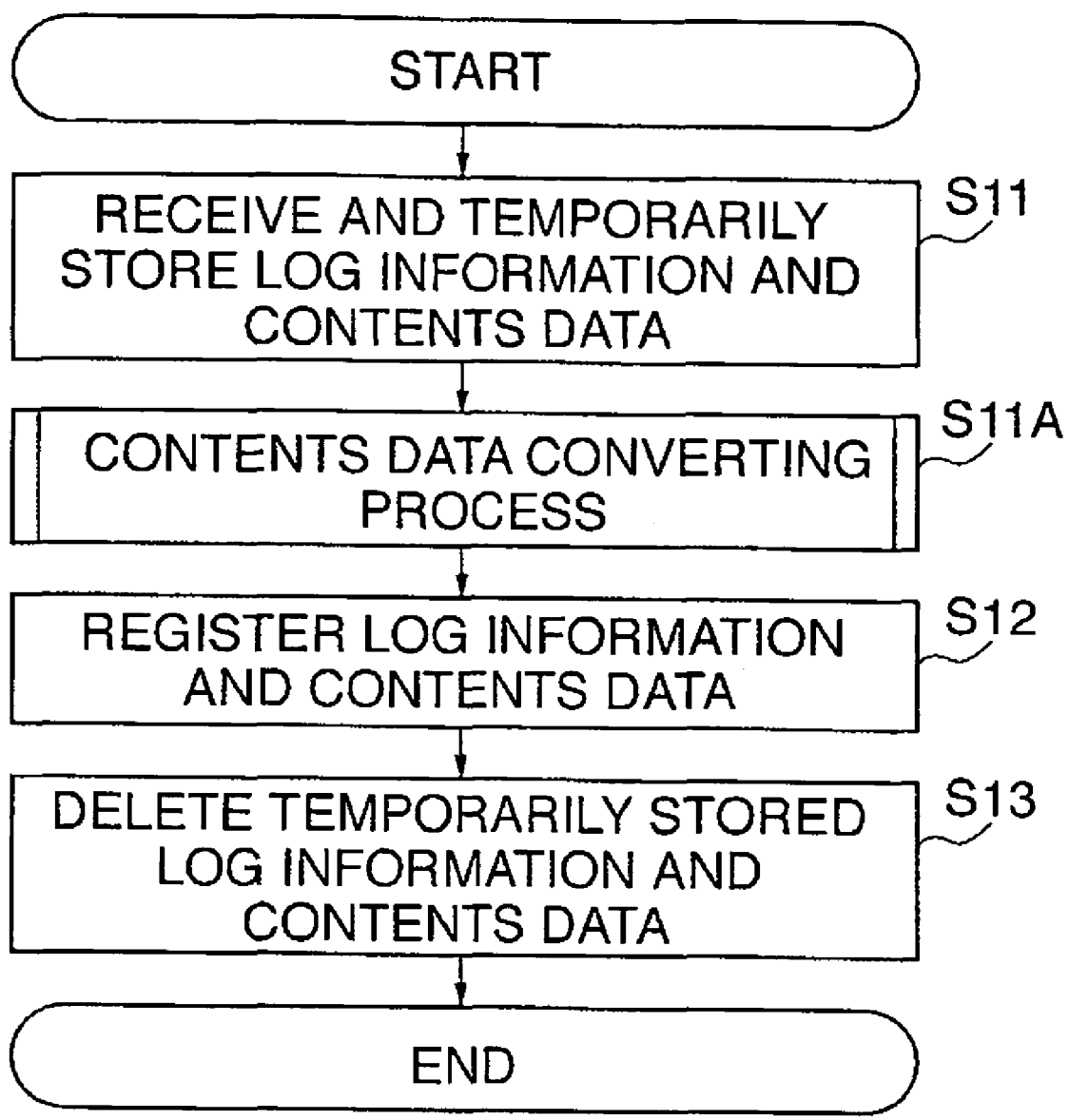
FIG. 20 is a flow chart showing the procedure of a process in which the document management server performs processing on log information and contents data of a job in the case where a contents data converting process is carried out by the document management server.

For example, although in the above described first to fifth embodiments, the contents data converting process is carried out by the digital multifunction apparatus, the contents data converting process may be carried out by the document management server. FIG. 20 is a flow chart showing the procedure of a process in which the document management server performs processing on log information and contents data of a job in the case where the contents data converting process is carried out by the document management server. A processing program therefor, which is stored in the external storage media 239 of the document management server 110, is temporarily loaded into the RAM 233 and then executed by the CPU 231 in response to reception of an advanced order for data transfer from the digital multifunction apparatus 130.

First, log information and contents data of a job is received from the digital multifunction apparatus 130 and temporarily stored in the hard disk drive 239*b* (step S11). Conversion of the stored contents data is then carried out (step S11A). In this contents data converting process, as in the processes in the first to fifth embodiments in the flow charts of FIGS. 15 to 19, contents data which is image data is converted into image data having a predetermined resolution, or character recognition is carried out to convert contents data which is image data into text data, and the resultant contents data is stored in a predetermined area of the hard disk drive 239*b* and the original contents data is deleted from a predetermined area of the hard disk drive 239*b*. Thereafter, the log information and the contents data are registered in the attribute storage section 114 of the attribute management server section 112 and the volume storage section 117 of the volume server section 115, respectively (step S12), and the temporarily stored log information and contents data are deleted from the predetermined area of the hard disk drive 239*b* (step S13), followed by termination of the present process. As a result, the space used in the hard disk drive 239*b* of the document management server 110 can be reduced.

As described above, in the case where the contents data converting process is carried out by the document management server, not by the digital multifunction apparatus, the process in the step S2 in FIG. 12 is not carried out by the digital multifunction apparatus. The contents data converting processes in the flow charts of FIGS. 15 to 19 are carried out by the document management server. In this case, upon receiving a document registration request (see the processing T9 in FIG. 14) from the digital multifunction apparatus, the document management server starts the contents data converting process.

Also, a plurality of conditions for converting image data into text data in the second to fifth embodiments described above may be arbitrarily combined into new conditions by logical "OR" or logical "AND", and whether to convert image data into text data may be determined using the new conditions. It is therefore possible to set in details the conversion of image data into text data.

Also, although in the network document management system (see FIG. 1) according to the above described embodiments, only one document management client, one document management server, and one digital multifunction apparatus are connected to the network, it goes without saying that arbitrary number of these apparatuses may be connected to the network, and other apparatuses such as a data transfer apparatus may be connected to the network. Also, although in the above described embodiments, the digital multifunction apparatus having multiple functions is shown as a image forming apparatus capable of generating image data, the image forming apparatus may be a scanner apparatus or a printer apparatus having a single function or a general-purpose computer capable of generating image data in, for example, bit image format.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Moreover, it is understood that the functions of the embodiments described above may be realized not necessarily by causing the computer to read and execute the program code, but alternatively by causing an operating (OS) system running on the computer to perform part or all of the actual processing based on instructions in the program code.

In this case, the program code may be supplied directly from a storage medium on which the program code is stored, or from a computer, database, or the like, not shown, that is connected via the Internet, a commercial network, a local area network, or the like.

Although in the above described embodiment, the electrophotographic printing is adopted as the printing method executed by the digital multifunction apparatus, there is no intention to limit the invention to this. For example, the present invention may be applied to a variety of printing methods such as ink-jet printing, thermal transfer, thermal printing, electrostatic printing, and discharge breakdown printing.

The form of the above program may be an object code, a program code executed by an interpreter, or script data supplied to an OS (operating system).

This application claims the benefit of Japanese Patent Application No. 2005-183461 filed Jun. 23, 2005, which is hereby incorporated by reference herein in its entirety.

What is claimed is:

1. A document management system comprising:
   an image forming apparatus that is connected to a network; and
   an information processing apparatus that is connected to the network,
   wherein the image forming apparatus comprises:
   a generating unit configured to generate image data indicative of contents of a job and log information indicative of a result of the job when the image forming apparatus executes the job;
   a first determining unit configured to determine whether or not a number of unauthorized job executions of a user is less than a predetermined number;
   a text converting unit configured to carry out character recognition to convert the generated image data into text data when said first determining unit determines that the number of unauthorized job executions of the user is less than the predetermined number;
   a second determining unit configured to determine whether or not a predetermined keyword is included in the text data;

a managing unit configured to manage the number of unauthorized job executions of the user which is increased by one when said second determining unit determines that the predetermined keyword is included in the text data and;
a sending unit configured to send the text data and the log information to said information processing apparatus when said first determining unit determines that the number of unauthorized job executions of the user is less than the predetermined number, and configured to send the generated image data and the log information to said information processing apparatus when said first determining unit determines that the number of unauthorized job executions of the user is not less than the predetermined number,
wherein said information processing apparatus comprises:
a receiving unit configured to receive the text data and the log information sent by the sending unit when the sending unit sends the text data and the log information, and configured to receive the image data and the log information sent by the sending unit when the sending unit sends the image data and the log information; and
a data registration unit configured to register the received text data or the received image data in association with the received log information in a storage medium.

2. An image forming apparatus connected to an information processing apparatus via a network, comprising:
a generating unit configured to generate image data indicative of contents of a job and log information indicative of a result of the job when the image forming apparatus executes the job;
a first determining unit configured to determine whether or not a number of unauthorized job executions of a user is less than a predetermined number;
a text converting unit configured to carry out character recognition to convert the generated image data into text data when said first determining unit determines that the number of unauthorized job executions of the user is less than the predetermined number;
a second determining unit configured to determine whether or not a predetermined keyword is included in the text data;
a managing unit configured to manage the number of unauthorized job executions of the user which is increased by one when said second determining unit determines that the predetermined keyword is included in the text data; and
a sending unit configured to send the text data and the log information to said information processing apparatus when said first determining unit determines that the number of unauthorized job executions of the user is less than the predetermined number, and configured to send the generated image data and the log information to said information processing apparatus when said first determining unit determines that the number of unauthorized job executions of the user is not less than the predetermined number.

* * * * *